INVENTORS
Edmund B. Donner
BY Gerald E. Ellis
Wood, Herron and Evans
ATTORNEYS

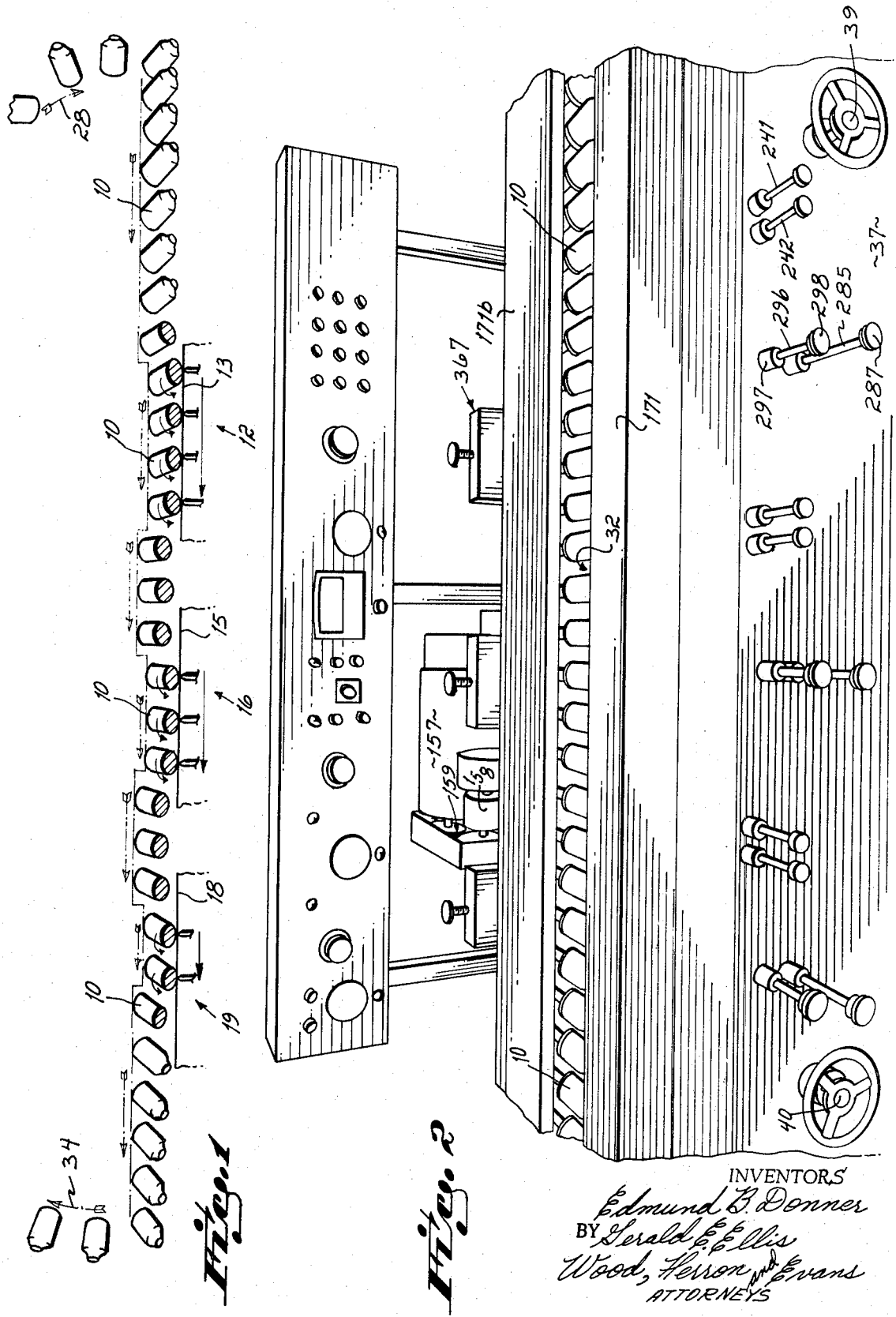

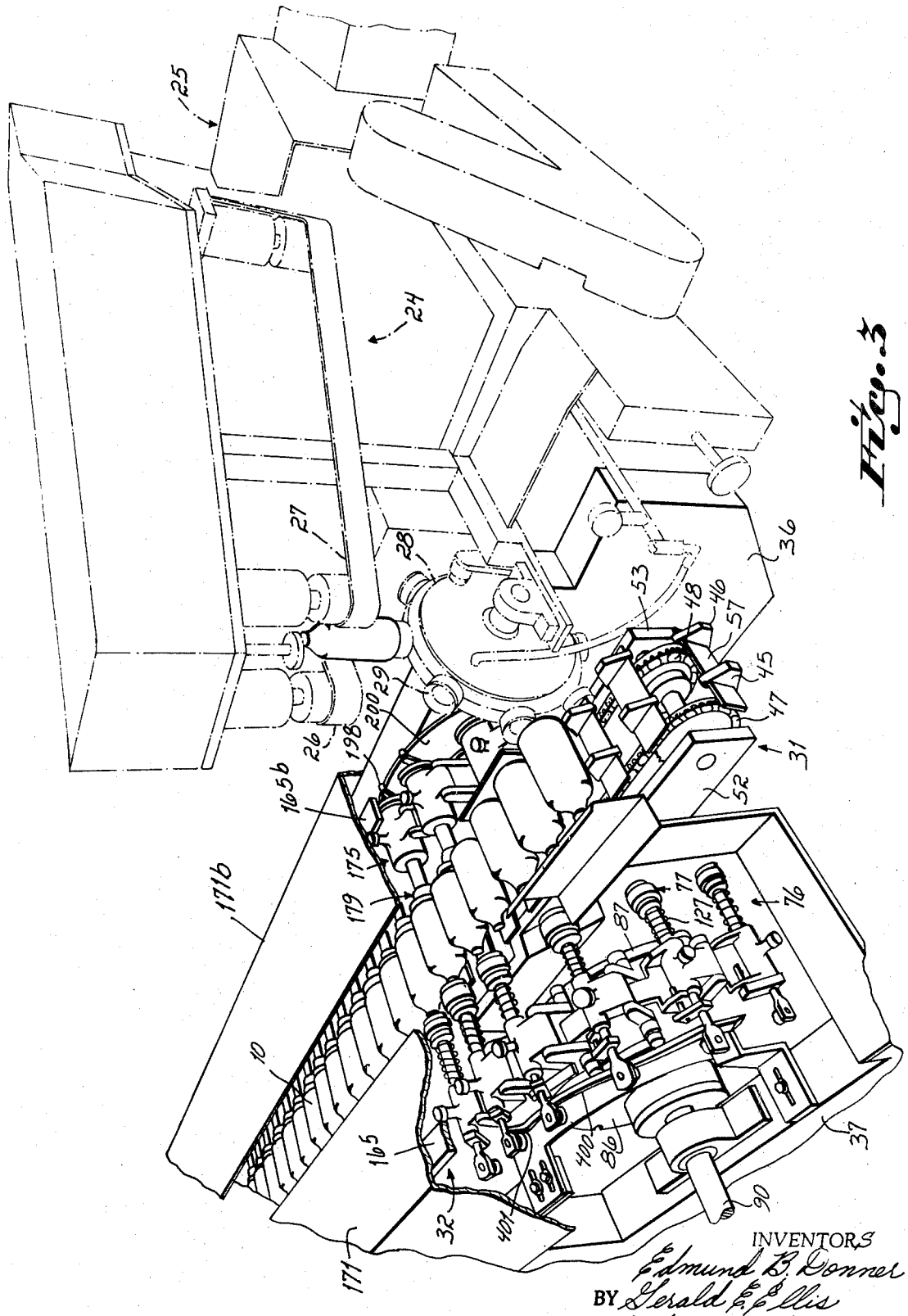

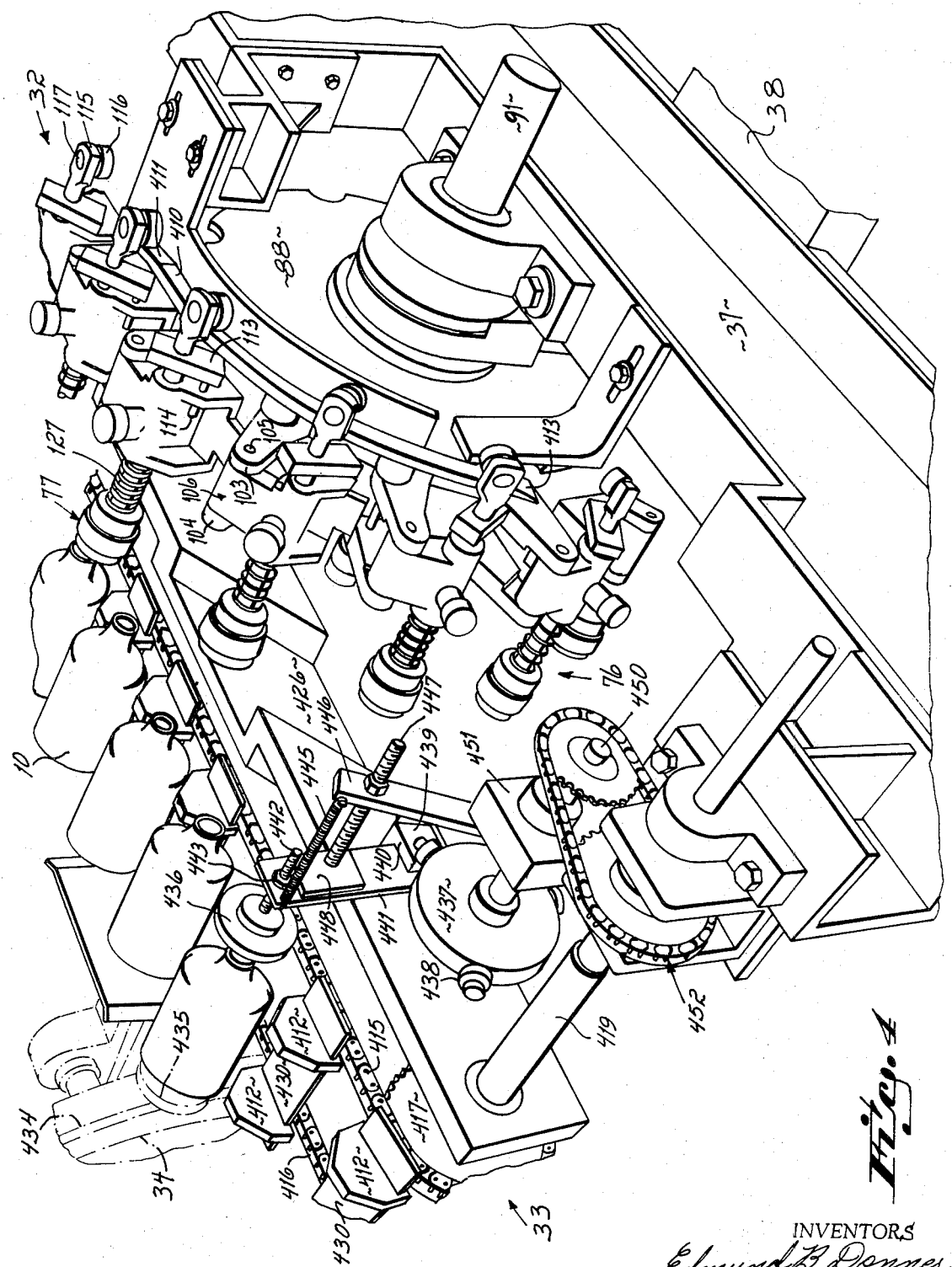

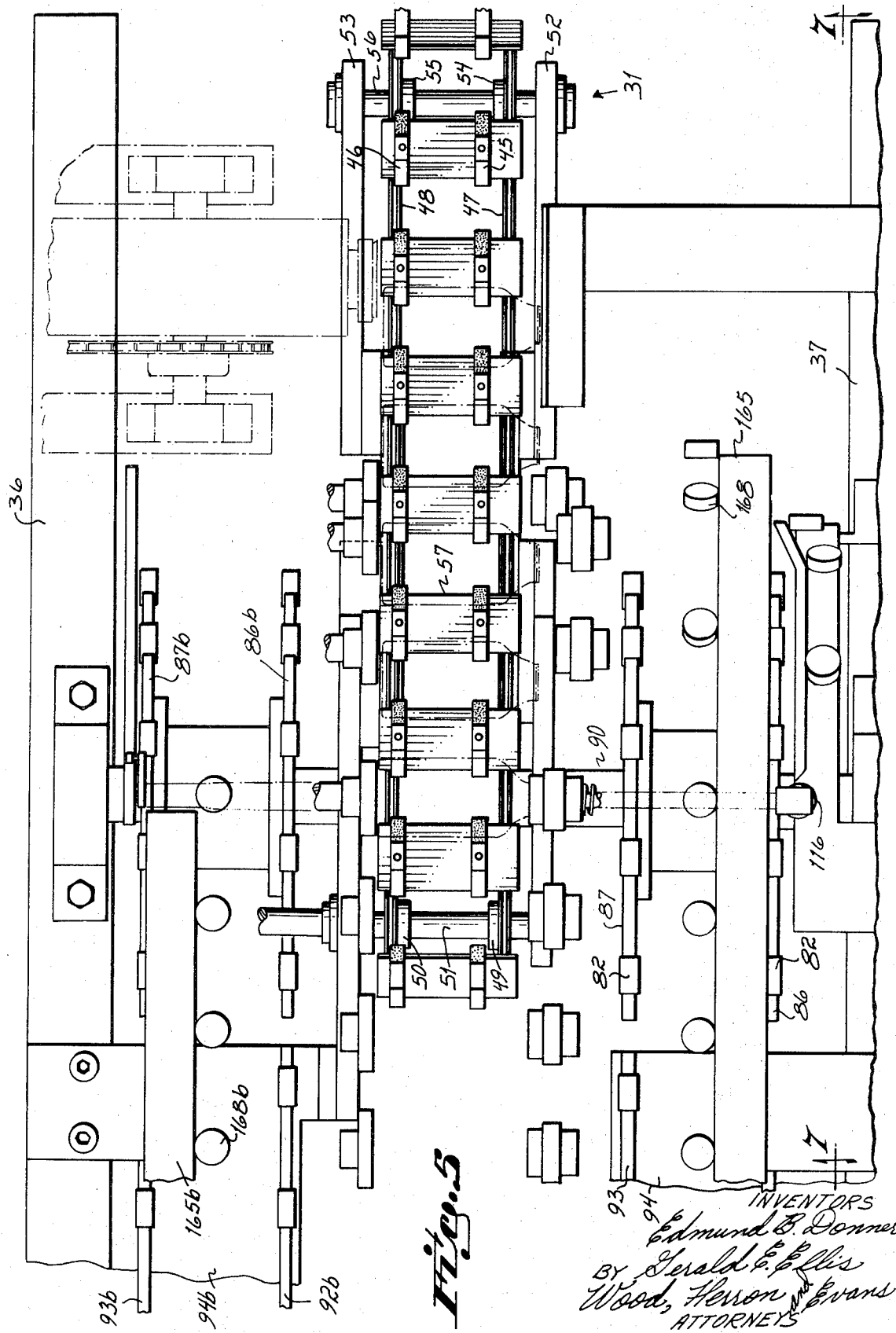

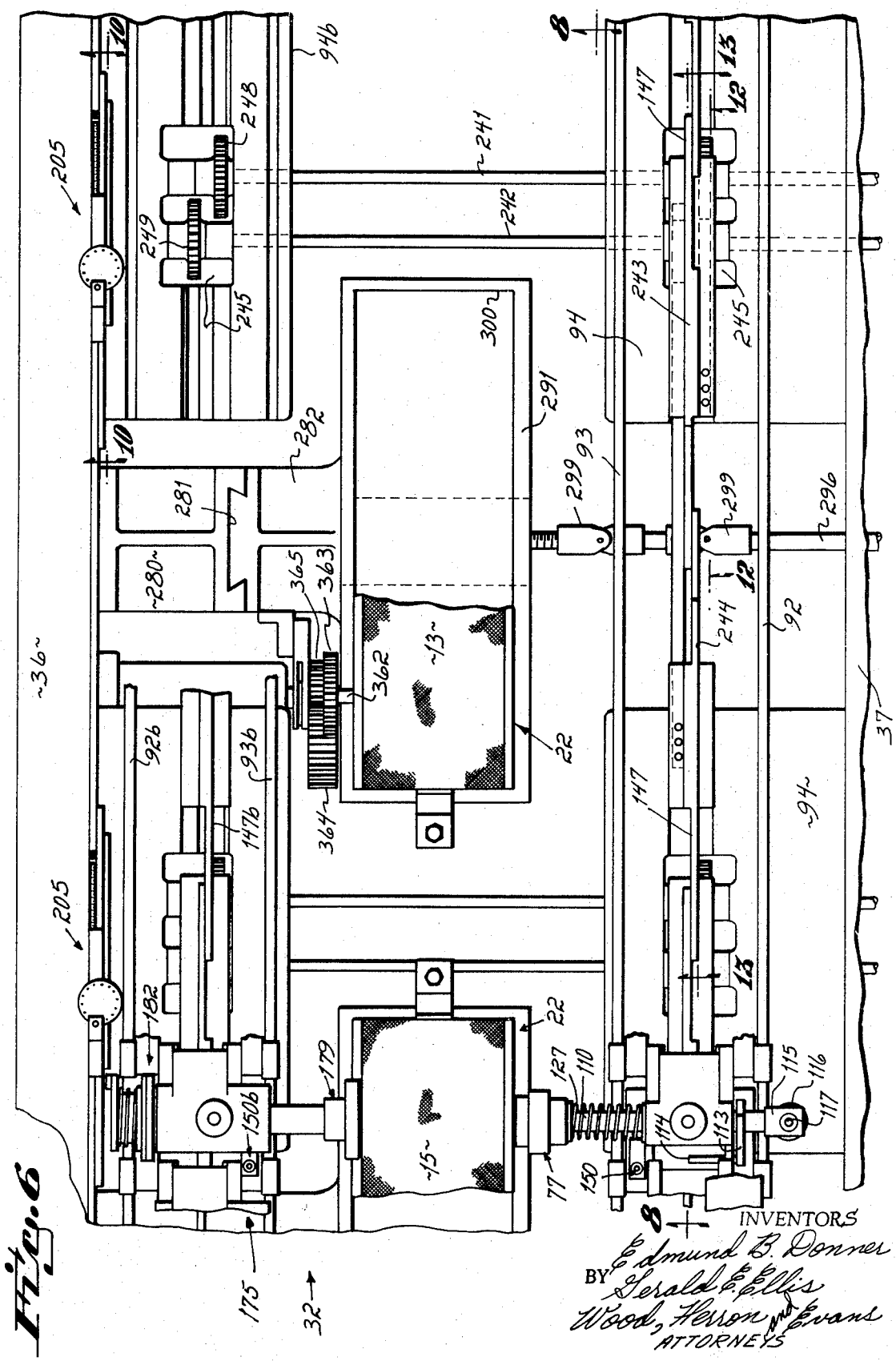

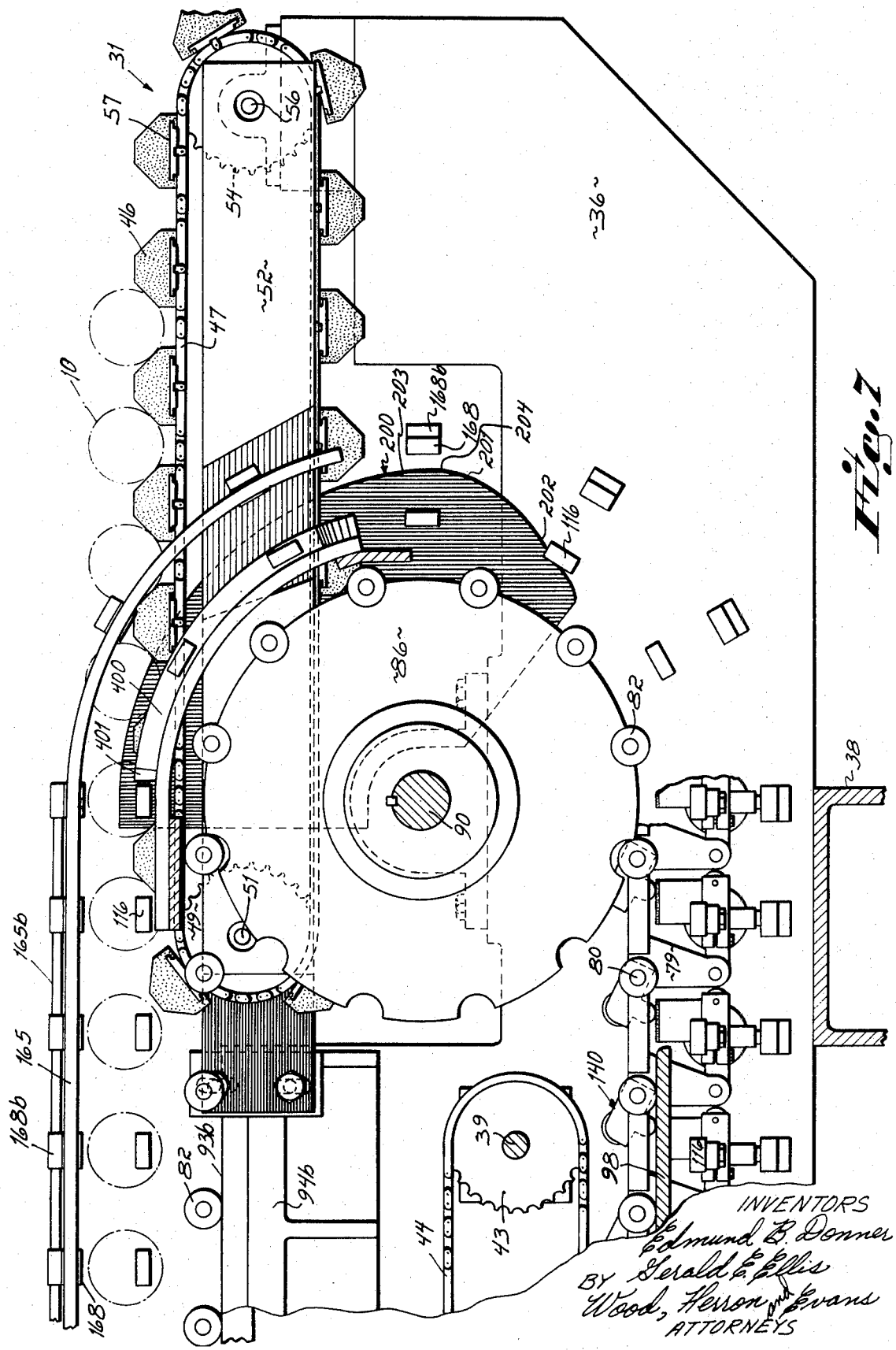

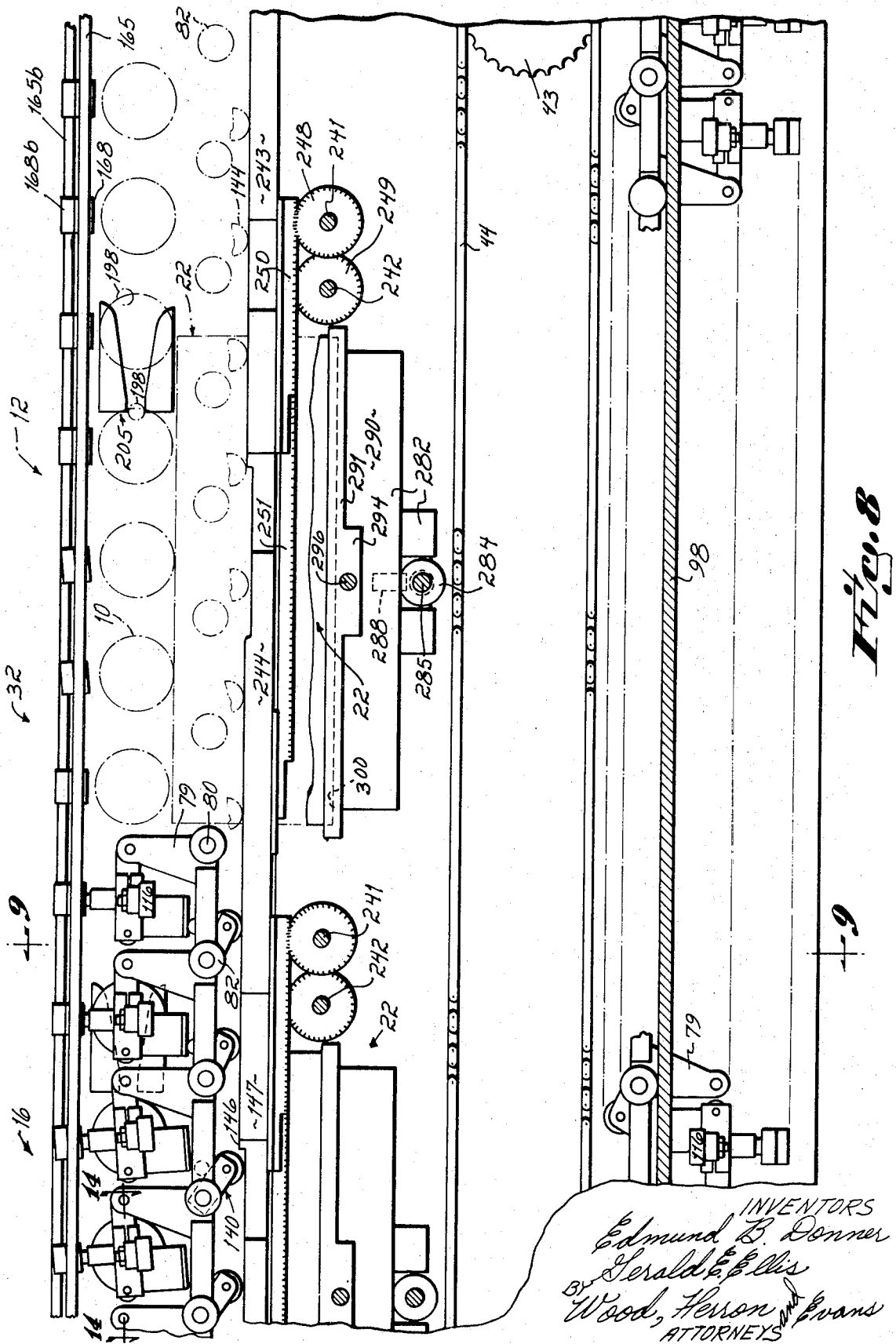

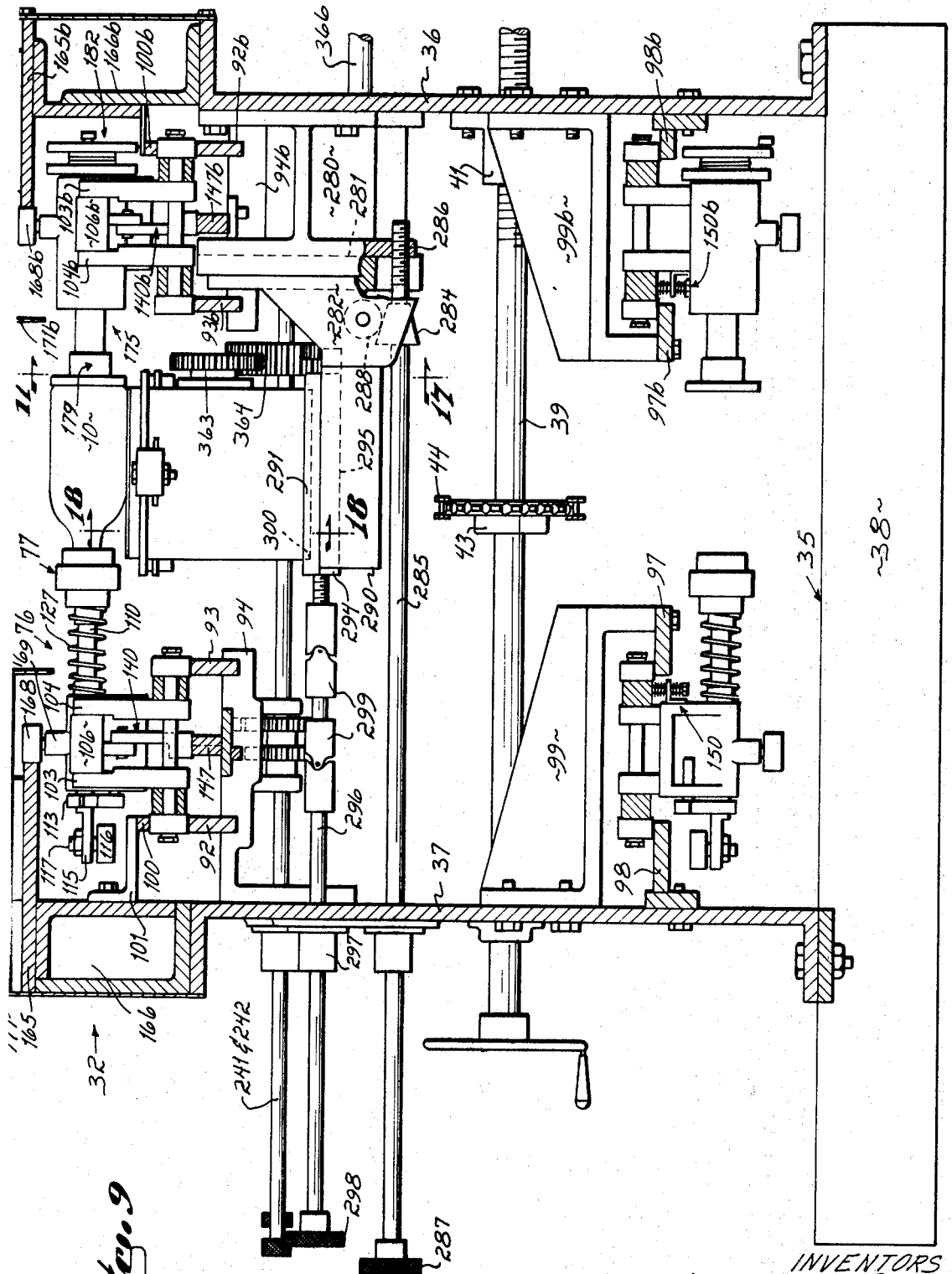

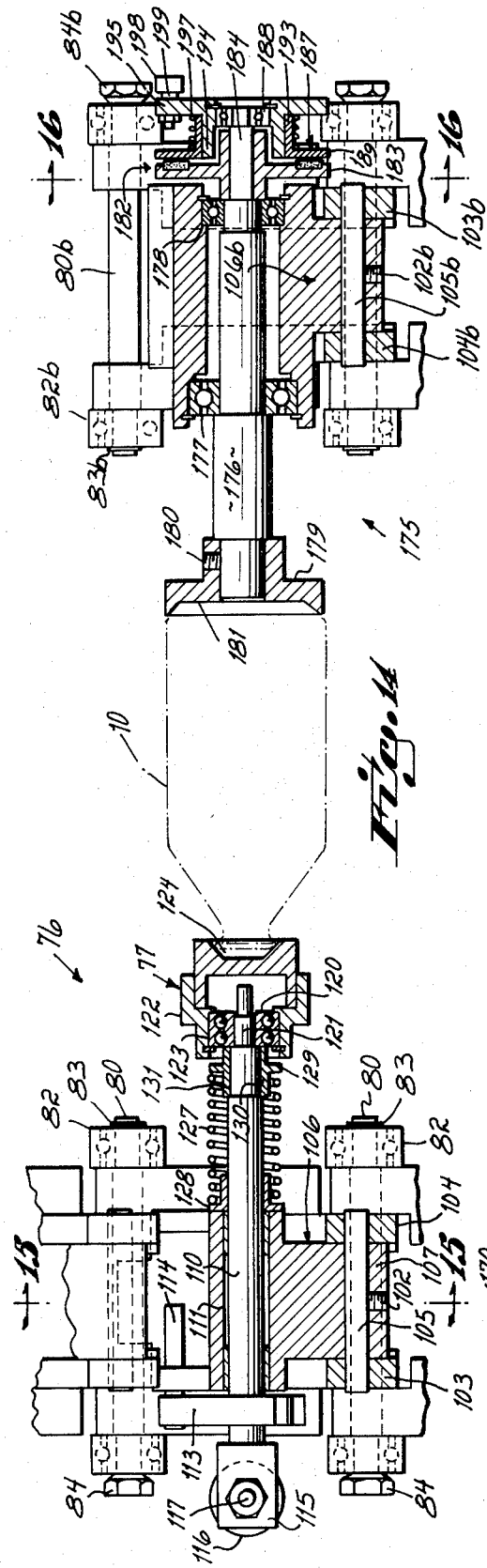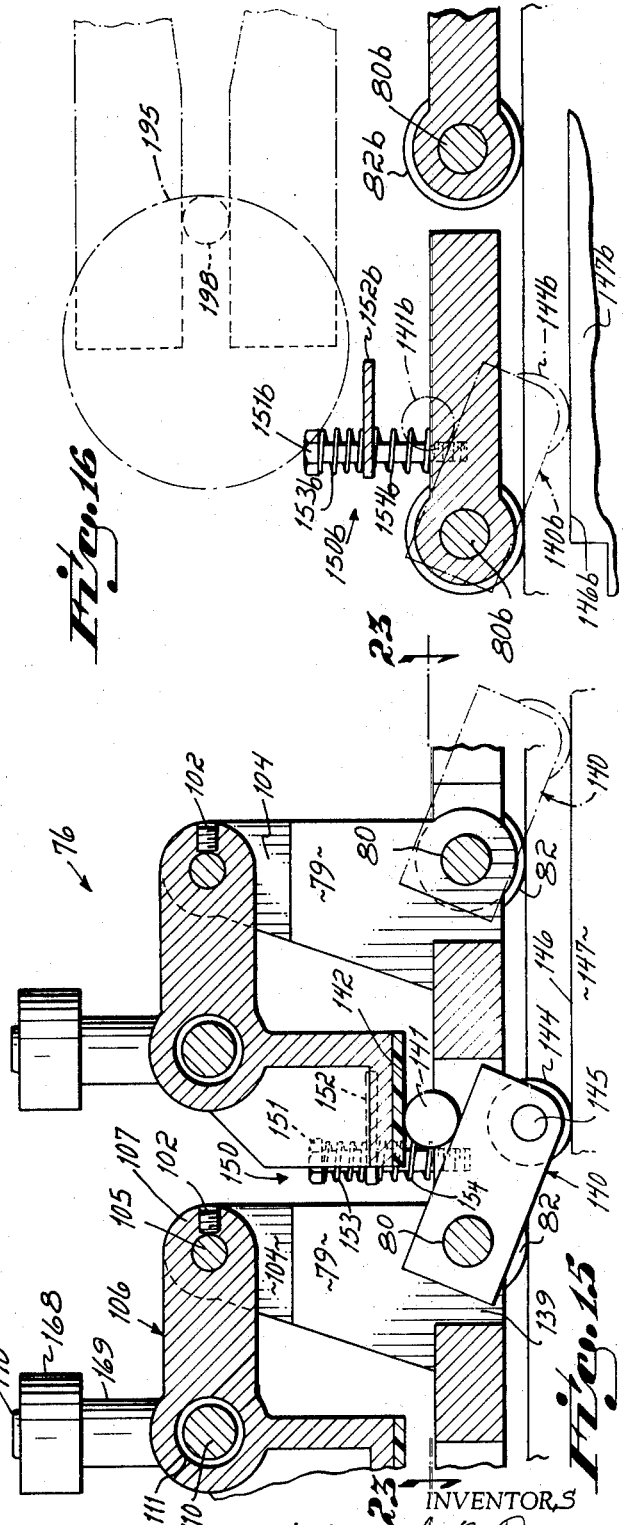

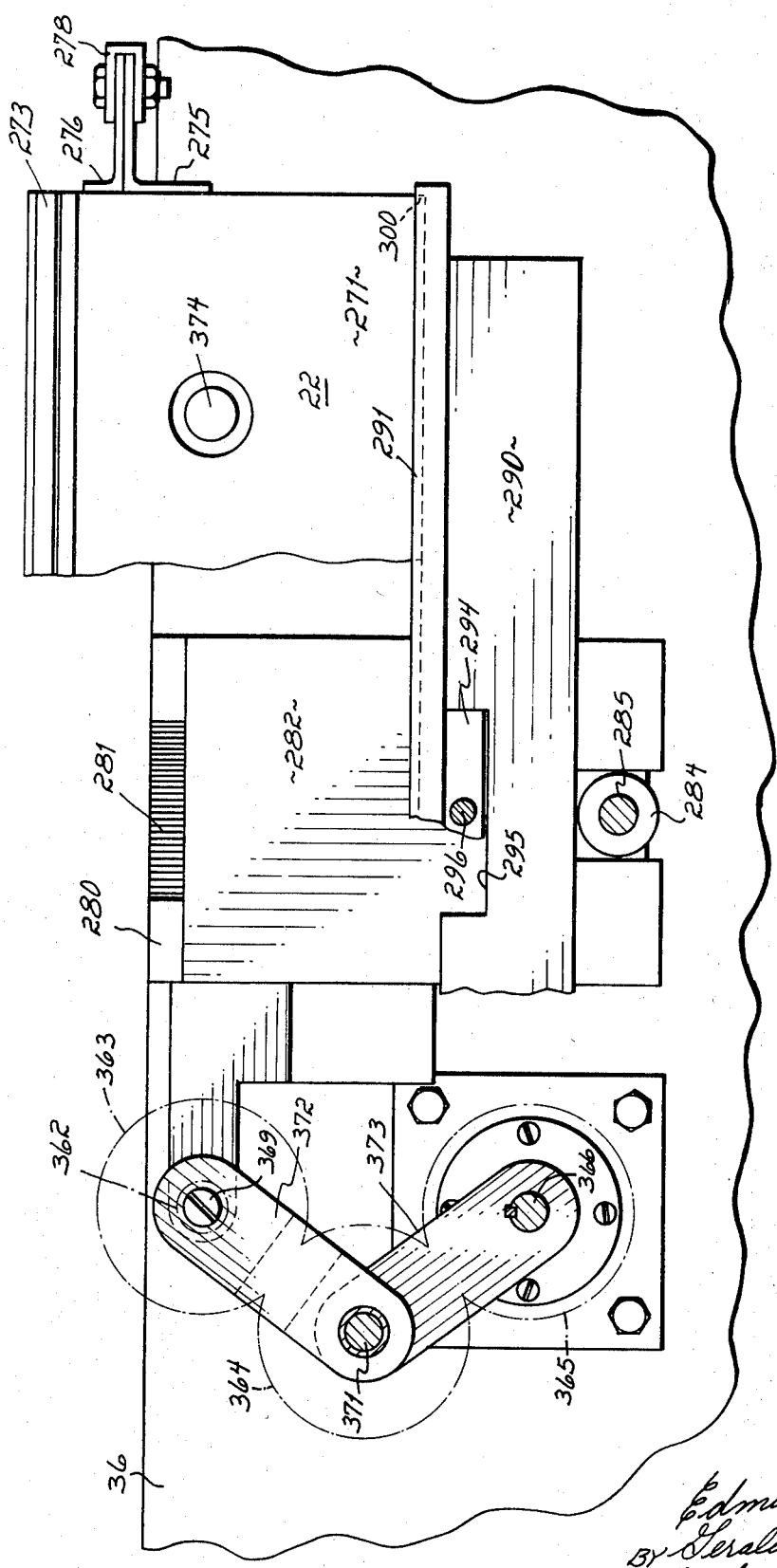

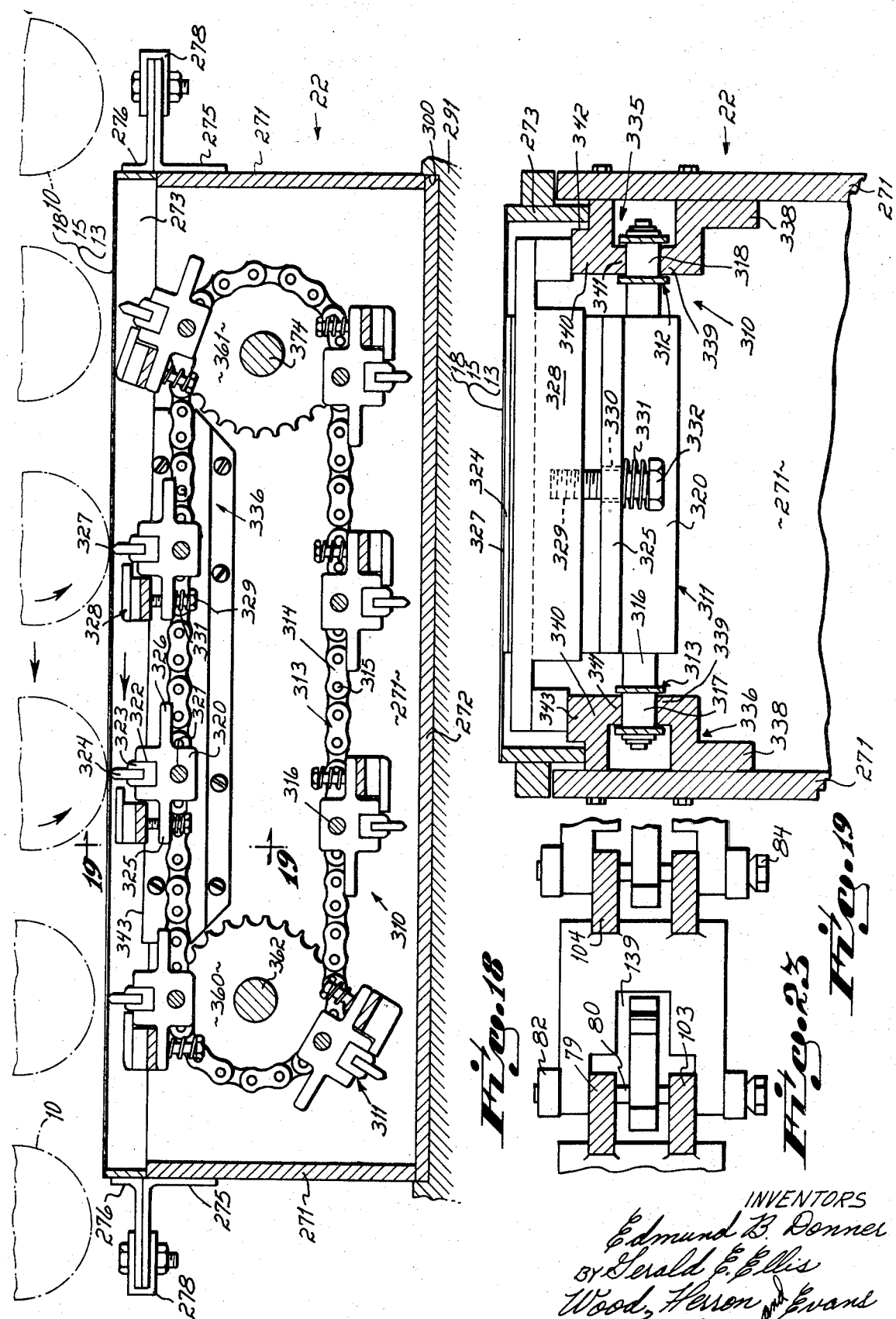

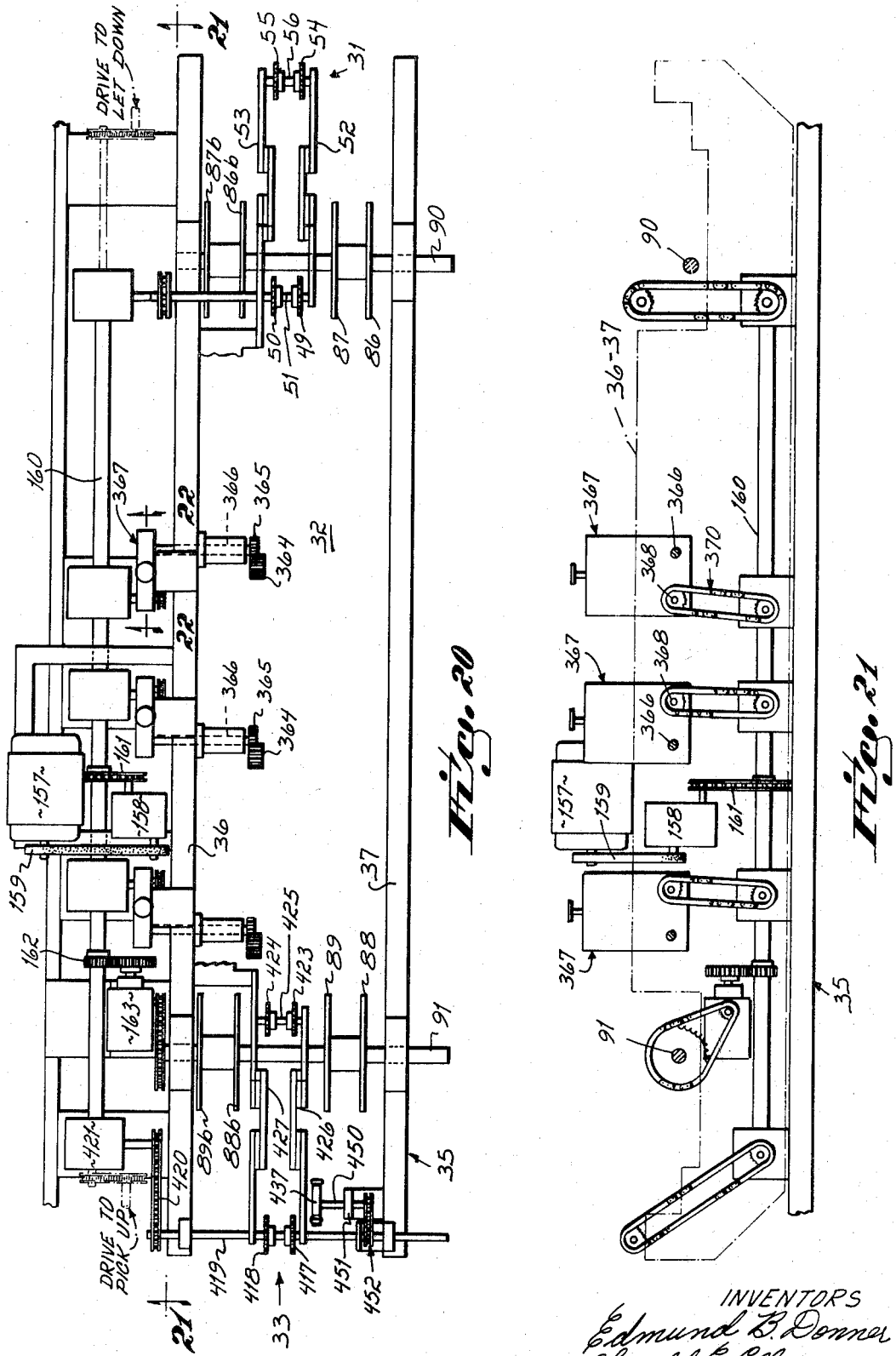

United States Patent Office

3,518,938
Patented July 7, 1970

3,518,938
STENCILLING APPARATUS WITH TRAVELING SQUEEGEE FOR DECORATING CONTINUOUSLY MOVING WARE
Edmund B. Donner and Gerald E. Ellis, Washington, Pa., assignors to Solar Engineering and Equipment Co., Beaver, Pa., a corporation of Pennsylvania
Filed Aug. 15, 1967, Ser. No. 660,799
Int. Cl. B41f 17/18; B41l 13/02
U.S. Cl. 101—40                                      23 Claims

ABSTRACT OF THE DISCLOSURE

An automated machine and method for decorating cylindrical or partially cylindrical ware. According to this method, a continuously moving stream of ware is rolled over a membrane which has a portion pervious to a decorative medium. As the ware rolls over the top of the membrane, the decorative medium is forced upwardly through the pervious portion of the membrane so as to deposit a decorative pattern on each item of ware.

BACKGROUND OF THE INVENTION

This invention relates to the decoration of partially cylindrical articles or articles which have a cylindrical section. It is particularly suited to and adapted for the decoration of glass bottles.

In an effort to compete with improved technology from the tin plated can and aluminum can industries, the glass bottle industry has been forced to produce improved bottles at less expense. This effort has led to the development and extensive commercialization of glass throw-away or "one way" bottle. So called "one way" bottles have now succeeded in replacing conventional returntable bottles in many applications and it is anticipated that the glass bottle industry will, before very long, have completely converted to throw-away bottles.

This conversion has resulted in higher quantity production in the glass bottle business with the result that prior art decorating techniques and equipment are so slow and expensive to operate that they are fast becoming obsolete. Consequently, a primary objective of this invention has been to provide an improved, high speed method and apparatus for decorating glass bottle which is suitable for the decoration of "one way" bottles.

Prior to this invention, every commercial glass bottle decorating machine was of the intermittent motion, reciprocating type, i.e., the bottles intermittently moved through a plurality of stations at which reciprocating screens or membranes deposited patterns of coloring compositions on the rotating bottles. A machine of this type is shown and described in U.S. Pat. No. 2,721,516.

Intermittent motion machines are very limited in the maximum rate at which they are capable of decorating bottles. As the speed of the machine is increased, the force required to accelerate and decelerate the bottles between stations very quickly exceeds the strength of the glass with the result that the rate of glass breakage become unacceptable.

SUMMARY OF THE INVENTION

This invention is predicated upon the elimination of intermittent motion of bottles through the machine. Specifically, it is predicated upon the concept of rolling continuously moving bottles over the "silk screen" or pervious membrane to transfer the decorative medium to the bottles.

The machine of this invention comprises a conveyor for transporting a row of continuously moving bottles along a horizonal path of travel past a series of stenciling stations. The bottles are supported by rotatable chucks in the conveyor so that they are free for rotation about the longitudinal axis of the bottles. During movement along the conveyor, the bottles are periodically indexed to locate a particular portion of each bottle over a screen or membrane. After having been indexed, the bottles are lowered onto the membrane. The bottles frictionally rotate over the screen while a pattern of decorative medium is forced upwardly through the screen and onto the bottles. After the pattern from one membrane has been applied to the bottle, it is lifted out of engagement with the membrane and moved forwardly over the next membrane where the process is repeated until several different patterns or colors have been applied to the bottles.

One of the primary advantages of this invention is the capability of decorating various sizes of bottles or ware at variable speeds. In moving through the machine, the bottles are supported between pairs of opposed chucks mounted upon a variable speed chuck conveyor. The chuck conveyor comprises two separate parallel conveyors; one for supporting the mouths of bottles and the other for supporting the bottoms of the bottles. One of the two conveyors is mounted upon an adjustable slide for movement toward and away from the conveyor so as to accommodate varying heights of bottles between the opposed pairs of chucks on the parallel conveyors.

Another primary advantage of this invention is its ability to decorate relatively fragile glass article at relatively high speeds. The continuous motion of the machine avoids excessive breakage attributable to quick starting and stopping of the bottles. Additionally, several bottles may be simultaneously in contact with the rolled over a single decorative membrane so that the speed of the machine in relation to its overall size is maximized.

Another advantage of this invention is its capacity to handle and decorate eccentric or out-of-round bottles. To this end, the bottle supporting chucks are spring supported so as to bias bottles into light engagement with the decorating screen or membrane. Consequently, out-of-round bottles are decorated just as well as perfectly formed bottles and scrapage is minimized.

These and other objects and advantages of this invention will be more readily apparent from the following description of the drawings in which:

FIG. 1 is a diagrammatic illustration of the sequence of operation followed by a row of bottles in passing through the decorating machine of this application.

FIG. 2 is a front perspective view of the center portion of the recorating machine.

FIG. 3 is a perspective view of the input end of the machine.

FIG. 4 is a perspective view of the output end of the machine.

FIG. 5 is a top plan view of the input end of the decorating machine.

FIG. 6 is a top plan view, partially broken away, of the center portion of the machine.

FIG. 7 is a cross-sectional view of the input end of the machine taken along line 7—7 of FIG. 5, portions of the drawings being omitted for clarity.

FIG. 8 is a cross-sectional view of the machine taken on line 8—8 of FIG. 6.

FIG. 9 is a cross-sectional view taken on line 9—9 of FIG. 8.

FIG. 14 is a cross-sectional view through a pair of bottle supporting chucks taken on line 14—14 of FIG. 8.

FIG. 15 is a cross-sectional view through one of the bottle supporting chucks taken on line 15—15 of FIG. 14.

FIG. 16 is a cross-sectional view through the other chuck of FIG. 14 taken on line 16—16 of FIG. 14.

FIG. 17 is a cross-sectional view, partially broken away, through a paint box taken on line 17—17 of FIG. 9.

FIG. 18 is a cross-sectional view through a paint box taken on line 18—18 of FIG. 9.

FIG. 19 is a cross-sectional view through a squeegee paint elevator taken on line 19—19 of FIG. 18.

FIG. 20 is a top plan view of the drive mechanism of the machine.

FIG. 21 is a cross-sectional view through the drive mechanism of the machine taken on line 21—21 of FIG. 20.

FIG. 23 is a cross-sectional view taken along line 23—23 of FIG. 15.

Figure 10:
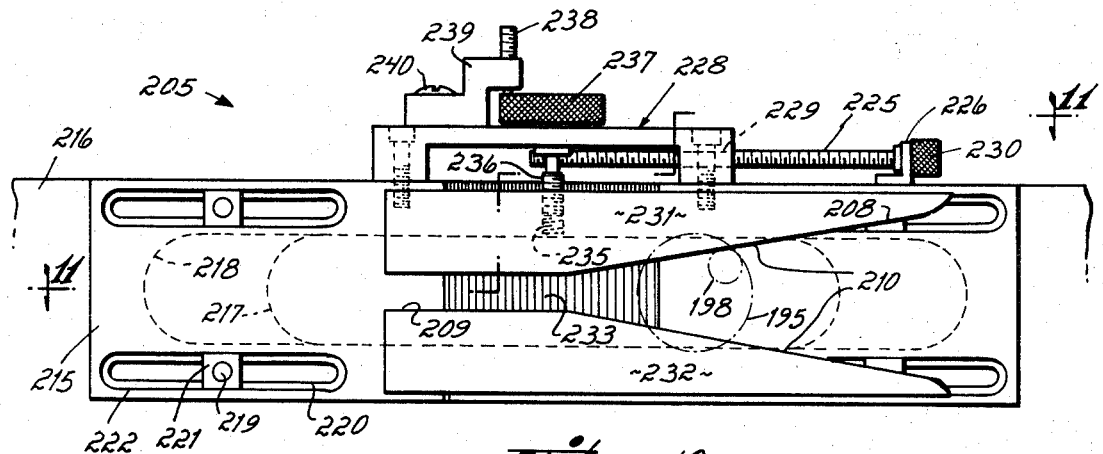
FIG. 10 is a front elevational view of the bottle indexing apparatus taken on line 10—10 of FIG. 6.

In the following detailed description, the invention is described in relation to the decoration of glass bottles with three different colored patterns at three different stenciling stations; but it will be obvious that with minor changes, other materials and types of ware of generally cylindrical or partially cylindrical shape may be utilized in the practice of this invention, and that additional colors or fewer colors or patterns may be applied by the useof additional or fewer stenciling stations.

The major parts of the machine and their functions are described in detail under separate headings; however, to facilitate a full understanding of the machine, attention is first directed to the flow diagram of FIG. 1 which illustrates the movement of ware through the machine and the sequential method steps of this decorating process. As may be seen in FIG. 1, bottles enter the machine from the right hand side of the diagram through a let down station at which bottles are moved fram a vertical or upstanding position into a let down or horizontal position on a conveyor. This let down mechanism deposits the bottle on an infeed conveyor which subsequently moves the bottles to the left as viewed in FIG. 1 to a position in which the bottles are picked up by the main chucking conveyor of the machine. In this main conveyor of the machine, each bottle 10 is chucked and supported for rotation about the horizontal axis of the bottle.

Just prior to arrival of the bottles at the first stenciling station 12 of the machine, each bottle is indexed so as to locate one portion of the bottle in a predetermined angular position. After this indexing operation, the bottle 10 is moved vertically downwardly or is lowered into frictional engagement with the top of the membrane or stenciling screen 13 of the first stenciling station 12. This membrane is located over the top surface of a paint box and has a portion pervious to a decorative medium or coloring agent in the paint box and another portion impervious to the same decorative medium.

When in contact with the membrane, the bottle is free to rotate with its supporting chuck so that frictional contact of the bottle with the membranes effects rotation of the bottle over the membrane as the bottle is moved forwardly on the main chucking conveyor. While the bottle is rolling over the membrane 13, the decorative medium is forced upwardly through the membrane so that a pattern of decorative material is deposited on each bottle.

In rolling over the membrane 13 on the top of a paint box at a stenciling station, each bottle rolls through an arc of slightly less than 360°. Thus, there is no chance of deposited paint or coloring agent on the bottle becoming smeared. The coloring agent or decorative material is a commercially available fast setting organic or inorganic coloring material which sets sufficiently quickly that subsequent contact of the decorating medium with a subsequent stenciling membrane, or with the same membrane if rolled through more than 360°, does not smear the pattern deposited at an earlier station.

After a bottle has rolled through approximately one revolution at the first stenciling station 12, it is lifted off of the membrane 13 at this stenciling station. It is then moved forwardly by the main conveyor to a second indexing station 16 at which the bottle is again angularly oriented preparatory to contact with the stencil or membrane 15 of the second stenciling station 16. Immediately after having been again oriented to a predetermined angular position, the bottle is dropped or lowered into contact with the membrane 15. While engaged with the membrane 15, the bottle is moved forwardly on the main conveyor so that the bottle rolls over the membrane and has a second decorative pattern deposited on the bottle. In most applications, the second pattern is a foreground pattern which is deposited directly upon the top of a different colored background pattern placed on the bottle at the first stenciling station.

After having rotated over the membrane 15 at the second stenciling station, the bottle is lifted vertically out of contact with the membrane and is moved forwardly to a third stenciling station while out of contact with the stenciling screen. At the third stenciling station, the bottle is again rotated to a predetermined angular position after which it is dropped or lowered into contact with the top surface of a third stenciling membrane 18 at the third stenciling station 19. While engaged with the membrane 18, frictional contact of the bottle with the membrane causes the bottle to roll over the membrane while a coloring material is forced upwardly through the previous portion of the membrane onto the surface of the bottle. After having rotated less (or more if desired) than 360° over the top of the third membrane 18, the bottle is lifted out of engagement with the membrane 18 and is transported forwardly to an output conveyor.

The main chucking conveyor then deposits the decorated bottles onto the output conveyor which moves the bottles forwardly to a pickup station. At the pickup station, the bottles are moved from the horizontal plane into a vertical plane from whence they are conveyed out of or away from the decorating machine to a drying kiln or oven.

General organization of the machine

Generally, as seen in FIGS. 2, 3, 4 and 8, the decorating machine of this invention comprises a bottle let down mechanism 28, an infeed conveyor 31, a main or chucking conveyor 32, an output conveyor 33, and a bottle pick-up mechanism 34 for transferring bottles to an outfeed conveyor (not shown). Additionally, the machine includes a plurality of stenciling stations 12, 16 and 19, each one of which includes a paint box 22 having a stenciling screen or membrane 13, 15 and 18 located over the top surface, and a conveyorized train of squeegees for forcing paint or decorative medium upwardly through the membrane onto bottles as they are rolled over the membrane.

These conveyors and the stenciling stations are all supported from a machine frame which includes a stationary base 35, a stationary rear support plate 36, and a movable front plate 37. To facilitate adjustment of the front frame plate on the base 35 so as to accommodate varying size bottles in the machine, the base includes a pair of transversely extending guide rails 38 located adjacent opposite ends of the machine frame. The front frame plate 37 has a pair of slots defined into its bottom surface and adapted to slide over these rails 38. Adjustment of the distance from the rear plate to the front plate is controlled by a pair of adjustment screws 39, 40. These screws are rotatably supported between the two plates 36, 37 and are secured against axial movement relative to the front plate 37. The rear ends of these screws are threaded through nuts 41 (FIG. 9) attached to the rear frame plate 36 so that rotation of the screws 39, 40 moves the threads into or out of the nuts 41, thereby causing the front frame plate 37 to be moved toward or away from the rear plate 36, depending upon the direction of screw rotation. To insure that both screws are rotated together through the same angular displacement, both screws have a sprocket 43 drivingly keyed to the screw and interconnected by a drive chain 44. Thus, rotation of one screw upon turning of a handwheel attached to the front of the screw effects the same degree of angular displacement of the other screw via the chain and sprocket 43, 44 drive. As is explained more fully hereinafter, the front half of the main or bottle chucking conveyor 32 is mounted upon the front frame plate 37 so as to be adjustable with the frame plate 37. This adjustment of the plate 37 thus enables the distance between the mouthpiece chucks 77 and the backstopping chucks 179 of the main conveyor 32 to be varied so as to accommodate differing size bottles in the machine.

Let down mechanism

Bottles are fed in single file on an infeed conveyor 25 into the decorating machine of this invention. On this conveyor 25, the bottles are spaced apart a predetermined distance by a conventional spacing mechanism preparatory to arrival at a transfer conveyor 24. On this latter conveyor 24, the spaced bottles are supported between a pair of feed belts 26, 27 which convey the bottles to the let down wheel 28. The conveyors 24, 25 and the let down wheel 28 form no part of the inventive subject matter of this application and have not, therefore, been described in detail herein. The let down wheel 28 is the subject matter of another application which is assigned to the assignee of this application. Other conventional let down mechanisms could, however, be substituted for the bottle let down mechanism illustrated herein.

Very briefly, the wheel 28 has a plurality of suction cups 29 mounted upon its peripheral surface. It is rotatable about a horizontal axis so as to transfer a bottle from between the belts 26, 27 to the infeed conveyor 31 of the machine and to rotate the bottle through 90° during the transfer. Rotary movement of the let down wheel 28 is synchronized with the movement of the infeed conveyors 24, 25 so that upon arrival of a bottle at the let down mechanism 28, one of the suction cups 29 is located immediately beneath the bottle. Upon location of a bottle upon one of the suction cups, a vacuum is applied to the cup so that subsequent rotary movement of the let down wheel carries the bottle from the vertical plane to a horizontal position on the infeed conveyor 31.

The let down wheel 28 is also synchronized with the infeed conveyor 31 of the machine so that continuous counterclockwise rotation of the wheel 28, as viewed in FIG. 3, effects sequential placement of the bottles in bottle receiving pockets of the continuously moving infeed conveyor 31. The vacuum is released and the suction cups opened to atmospheric pressure just prior to arrival of the bottles on the infeed conveyor 31 so that the bottles are released just prior to being deposited on the rubber bumpers which define the pockets of the infeed conveyor 31.

Infeed conveyor

As may be seen most clearly in FIGS. 5 and 7, the infeed conveyor 31 comprises a pair of endless chains 47, 48 driven through sprockets 49, 50 by a drive shaft 51. This shaft 51 is rotatably journalled within stationary front and rear conveyor frame plates 52, 53 which are rigidly secured to the machine frame. At the upstream end, the chains 47, 48 are supported upon idler sprockets 54, 55 which are keyed to an idler shaft 56. This shaft 56 is also rotatably journalled within the same frame plates 52, 53.

Parallel support plates 57 extend between and are supported from links of the drive chains 47, 48. A pair of spaced bottle supporting lugs 45, 46 is mounted upon each of the supporting plates 57. The outer end of each of the lugs 45, 46 terminates in a tapered rubber bumper or bumper surface. Bottles are supported on the conveyor by resting between adjacent pairs of vertical lugs or bumpers 45, 46 as illustrated in phantom in FIG. 7.

Main bottle chucking conveyor

The main or chucking conveyor 32 comprises two different chuck conveyors; a mouthpiece chuck conveyor 76 and a backstopping chuck conveyor 175 which are cooperable to support rows of bottles therebetween. The front or mouthpiece conveyor 76 is movably mounted upon the front frame plate 37 and comprises an endless series or chain of bottle neck supporting chucks. Similarly, the backstopping chuck conveyor 175 is supported on the stationary frame plate 36 and comprises a chain of backstopping chuck assemblies adapted to rotatably support the bottoms of bottles supported between the two conveyors.

Referring particularly to FIGS. 14 and 15, it will be seen that the mouthpiece chuck conveyor 76 comprises a long series of interconnected links or supporting brackets 79. These brackets 79 are pivotally interconnected by link pins 80 so that the complete series of supporting brackets 79 form a long endless chain of brackets. In other words, each bracket 79 forms one link in the chain of brackets and is pivotally connected at both its forward and trailing ends to two other brackets in the chain. The pivotal interconnection is best illustrated in FIG. 23.

Guide or support rollers for this conveyor 76 in the form of ball bearings 82 are rotatably supported on both ends of each of the pins or shafts 80. At one end of each shaft 80, a snap ring 83 holds the bearing on the shaft and at the other end, a nut 84 is threaded onto the shaft 80.

The complete chain of brackets 79 is supported from and movable with the front frame plate 37 of the machine. To this end, the mouthpiece chuck conveyor 76 is supported at its upstream end by a pair of idler wheels 86, 87. At the downstream end, this conveyor 76 is rotatably driven by a similar pair of drive wheels 88, 89 (FIG. 20). The idler wheels 86, 87 are both drivingly keyed to an idler shaft 90 while the drive wheels 88, 89 are keyed to the drive shaft 91. For simplicity of the drawings, the details of the interconnection between the idler wheels 86, 87 and the drive wheels 88, 89 and the movable front frame plate 37 have not been illustrated in detail. However, these wheels are so mounted upon the shafts 90, 91 respectively and are so interconnected to the plate 37 that upon movement of the frame, the idler wheels 86, 87 and the drive wheels 88, 89 both move with the frame plate 37 and thus remain a fixed distance from the plate 37.

Between the driven wheels 86, 87 and the idler wheels 88, 89, the upper run of the mouthpiece chuck conveyor is supported upon guide rails 92, 93 (FIG. 9) located beneath the rollers 82 of the conveyor. Thus, the weight of the upper run of the mouthpiece chuck conveyor is supported by these gide rails 92, 93. A supporting bracket 94 extends inwardly from the front plate 37 and supports the rails 92, 93 for movement with the frame plate 37.

The lower run of the mouthpiece chuck conveyor 76 is similarly supported by a second pair of guide rails 97, 98 located beneath the rollers 82 of the conveyor 76. One of these rails 97 is bolted to an over hanging bracket 99 which is in turn bolted to the front frame plate 37. The other rail 98 is secured directly to the front frame plate 37. Thus, both guide rails 97, 98 are supported from the plate 37 and are thus movable with it.

To insure that the upper run of the mouthpiece chuck conveyor 76 never rides up off of the rails 92, 93. a hold down rail 100 may be secured to the front frame plate 37 by a bracket 101. This rail 100 extends for the full length of the conveyor 76 and is located immediately above one of the two sets of rollers 82 of the upper run such that the rollers cannot lift up and thus ride off of the guide rail 92.

Each supporting bracket 79 of the mouthpiece chucking conveyor 76 has a pair of vertically outstanding ears 103, 104 which are spanned by and rotatably support a pivot shaft 105. Each of the shafts 105 pivotally supports a movable bracket 106, the rearwardmost portion 107 of which extends between the ears 103, 104 of the supporting links 79. A set screw 102 secures each of the brackets 106 to the supporting shaft 105 so that pivotal movement of the movable bracket 106 relative to the supporting bracket 79 occurs as a consequence of rotation of the shaft 105 within the supporting ears 103, 104.

A chuck supporting shaft 110 extends transversely through and is slideable within an aperture 111 of each of the movable brackets 106. Rotation of the shaft 110 relative to the supporting brackets 106 is precluded by a lug 113 on the shaft. This lug supports a pin 114 which extends through an aperture of the supporting bracket 106.

The outer end of the shaft 110 termniates in a flat plate 115. As may be seen most clearly in FIG. 9, a roller 116 is rotatably supported upon a shaft 117 which extends vertically from this plate 115. This roller is engageable with a pair of cams 400, 410 to control transverse movement of the shaft 100 relative to the supporting barcket 106.

The inner end of each of the shafts 110 rotatably supports the mouthpiece chuck 77 of the conveyor 76. This chuck comprises a ball bearing 120 mounted upon a reduced diameter section 121 of the shaft 110; an annular sleeve 122 rotatably supported upon the outer race 123 of tihs ball bearing; and a hollow annular cap flxedly mounted within the sleeve 122. The cap has a tapered recess 124 for reception of the mouthpiece of bottles.

To bias each mouthpiece chuck 77 inwardly or toward the rear of the machine, a compression spring 127 is mounted over the inner end of each shaft 110. One end of this spring 127 abuts against a retainer ring 128 which is sildeably supported upon the shaft 110 and which in turn abuts against the inside edge of the movable bracket 106. The opposite end of this spring abuts against a flange 129 of a bushing 130 which is mounted upon a small diameter necked section 131 of the shaft 110 and has its innermost end abutting against the inner raceway of the ball bearing 120. Thus, the spring 127 functions to force the chucks 77 rearwardly.

Pivotal movement of the movable brackets 106 relative to the supporting brackets 79 is controlled by cam actuated feelers 140 acting through spherical bearings 141 upon the bottom surface 142 of the movable brackets 106. Each feeler 140 is vertically movable within a recess 139 located partially at the trailing end of a bracket 79 and partially in the forward end of the next following bracflet 79. The forward end of each feeler 140 is pivotally mounted upon one of the connecting pins 80 intermediate the ends of the pin. At its trailing end, each feeler 140 supports a roller 144 rotatably mounted upon a shaft 145. The bottom of this roller extends beneath the bottom edge of the feeler 140 and is rotatable over a cam surface 146 as may be seen most clearly in FIG. 15.

When the rollers 144 move off the cam surface 146, the movable brackets 106 are free to move downwardly so as to permit the bottle held in the mouthpiece chuck to come into contact with the decorating stencil. To conrol the force applied against the top of each stencil, each supporting bracket 106 is partially supported by a spring retainer assembly 150. This assembly comprises a bolt 151 threaded into the top of the supporting bracket 79 and extending through a vertical aperture of a flange 152 of the movable bracket. A compression spring 153 is located between the head of the bolt and the top surface of the flange 152 and a second compression spring 154 is located between the bottom of the flange 152 and the top surface of the supporting bracket 70.

When the roller 144 of the feeler 140 is engaged with the cam surface 146, the feeler element 140 is forced upwardly, thereby moving the attached spherical ball upwardly against the bottom surface 142 of the movable support bracket 106. This results in upward movement of the supporting bracket against the bias of the compression spring 153. When the roller 144 moves off of the cam surface 146, the spring 153 forces the movable bracket 106 downwardly and thereby moves a bottle supported by the movable bracket downwardly into engagement with a decorating stencil.

Referring now to FIGS. 20 and 21, there is illustrated the drive unit to the mouthpiece chuck conveyor 76. This drive unit comprises an electric motor 157 mounted upon the frame of the machine and operable to drive a gear reduction unit 158 through a V belt 159. The output shaft of the gear reduction unit drives a main drive shaft 160 of the machine through a chain and sprocket drive 161. The main drive shaft 160 is operable to drive a gear reduction unit 163 through gears 162 which in turn drives the drive shaft 91 through a chain and sprocket drive 164. Thus, the drive to the mouthpiece chuck conveyor 76 is synchronized with the drive to the remainder of the machine which is also driven from the main drive shaft 160, as is explained more fully hereinafter.

To control lateral movement of the supporting brackets 106, the upper run of the mouthpiece chuck conveyor 76 is backstopped by a supporting plate 165 mounted on the top of a beam 166 attached to the frame plate 37. The vertical inner edge of the plate 165 abuts against and forms a guide surface for rollers 168 secured to the top of a post 169 on each of the brackets 106. Each of the rollers 168 is rotatably mounted upon a pin 170 in the top of each of the posts 169 and is supported for rotation about the vertical axis of the pin 170. Preferably, a cover plate 171 is secured to the top surface of the backing plate 165 and extends rearwardly over the conveyor 76 so as to protect the operator of the machine from the moving parts of the conveyor 76.

Referring now to FIGS. 14 and 16, there is illustrated the backstopping chuck conveyor 175 which cooperates with the mouthpiece chucking conveyor 76 to support bottles during transfer through the decorating machine. Each chuck 179 of the backstopping chuck conveyor is cooperable with one chuck 77 of the mouthpiece chucking conveyor to support a bottle during movement through the machine.

The backstopping chuck conveyor 175 is generally similar to the mouthpiece chucking conveyor 76. Therefore, those components of the two conveyors which are identical have been given identical numerals, except that for purposes of differentiation, the numerals designating the backstopping conveyor are followed by the suffix b.

Specifically, the supporting brackets or links 79b of this conveyor 175 and the movable brackets 106b are identical to the corresponding parts of the mouthpiece chucking conveyor. The primary difference between the two conveyors resides in the mounting of the chuck supporting shaft. This difference is attributable to the fact that the backstopping chuck 179 is supported for rotation but is secured against axial movement relative to the axis of the supporting shaft 176.

As may be seen most clearly in FIG. 14, the chuck mounting shaft 176 is supported intermediate its ends by a pair of roller bearings 177, 178 mounted within a transverse aperture of the supporting bracket 106b. On its inner end, the shaft 176 nonrotatably supports the chuck 179 which is secured to the shaft by a set screw 180. The inner face of the chuck 179 is tapered inwardly to form a tapered recess or seat 181 for reception of a bottom of a bottle.

On its outer or innermost end, each of the shafts 176 supports a clutch, indicated generally by the numeral 182. This clutch 182 comprises a first or inner clutch plate 183 drivingly keyed to a small diameter section 184 of the shaft 176, and an outer clutch plate assembly 187 rotatably supported by a ball bearing 188 upon the outer end of the shaft 176. The outer clutch plate assembly 187 includes a second clutch plate 189 slideably supported upon an indexing control hub 194. A radial flange or disc 195 extends outwardly from the hub 194 and rotatably supports an indexing control roller or eccentric pin 198 upon a stub shaft 199. The clutch plate 189 is slideably keyed to the indexing control hub 194 and is biased into engagement with the outer radial surface of the inner clutch plate 183 by a compression spring 197 which is mounted over the hub 193 of the plate 189.

As is explained more fully hereinafter, the indexing control roller 198 is periodically passed through an indexing control throat so as to orient the roller 198 and thus the shaft 176 and the backstopping chuck 179 in a predetermined angular position. Manual reorientation of the angular position of the chuck 179 and a bottle supported by the chuck relative to the indexing control hub 194 is facilitated by the clutch 182 located between the hub 194 and the chuck supporting shaft 176.

To facilitate subsequent indexing or angular orientation of the bottles supported between the mouthpiece chucks 77 and the backstopping chucks 179, the indexing control roller 198 is located on the trailing side of a backstopping chuck asesmbly prior to engagement of the chuck with a bottle. To this end, the roller 198 is passed over a control cam 200 (FIG. 7) during passage of the backstopping conveyor 175 around the idler wheels 86b and 87b.

As may be seen most clearly in FIGS. 3 and 5, the control cam 200 is fixedly secured to the rear frame plate 36. Referring now to FIG. 7, it will be seen that the cam surface 201 of the control cam 200 is generally arcuate in shape and has a first rising cam surface section 202 followed by a generally circular arc cam surface 203. The center of the circular arc section 203 of the cam is located near but slightly behind the axis of the shaft 90 so that after passing the high point 204 of the cam, the indexing control rollers 198 may move slightly toward the axis of the shaft 90 while remaining on the cam surface. Consequently, as the backstopping chuck conveyor 175 passes around the idler wheels 86b, 87b, the indexing control rollers 198 all engage and ride up the surface 202 of the control cam 200. Irrespective of the location of the rollers 198 when they engage the cam surface 202, the rollers are all located at their radial outermost position or at their highest elevation when they pass the high point 204 of the cam surface 201. Upon continued movement over the cam 200, the indexing control rollers 198 are moved to the trailing side of the indexing control disc 195.

While the indexing control roller 198 is a backstopping chuck assembly is passing over the control cam 200, a control roller 116 of the corresponding mouthpiece chuck assembly on the mouthpiece chuck conveyor 76 passes over an arcuate cam 400 which controls opening of the chucks prior to engagement with a bottle supported upon the input conveyor. This latter cam 400 effects forward movement of the mouthpiece chuck 77 against the bias of the spring 127 so that a bottle on the input conveyor 31 may enter between the mouthpiece chuck 77 and a corresponding or parallel backstopping chuck 179. After the bottle enters between the two parallel running chucks, the roller 116 of the mouthpiece chuck assembly rides off of the cam 400 so that the spring 127 effects closing of the two chucks upon a bottle which is then entrapped between the two.

In operation, the input conveyor 31 is synchronized with movement of the main bottle conveyor 32 so that as bottles near the forward or downstream end of the input conveyor 31, they are engaged by and entrapped between the chucks 77, 179 of the main conveyor 32 which then continues forward bottle movement on the main conveyor as the bottle supports 46 of the input conveyor 31 passes around the drive sprockets 49, 50 of the input conveyor.

The cam 400 which controls opening of the chucks is mounted upon the front frame plate 37 of the machine and is generally arcuate in shape. The radial face of the cam 400 slopes toward the front of the machine at both ends of the cam in the path of movement of the rollers 116 on the mouthpiece chuck assemblies. As the rollers 116 move onto the cam surface, they are forced toward the front of the machine; thereby moving the shaft 110 and the attached chuck 77 forwardly against the bias of the compression spring 127. The chuck 77 then remains in this forward or open position as the roller 116 moves over the radial surface of the cam 400. As the roller passes over the rearwardly sloping forward or downstream end 401 of the cam 400, the roller and chuck 77 move inwardly as a consequence of the compression spring 127 acting between the chuck and the chuck supporting bracket 106. Upon inward movement of the mouthpiece chuck 77, a bottle on the input conveyor 31 is entrapped between the mouthpiece chuck 77 and the backstopping chucks 179.

After having engaged a bottle between a mouthpiece chuck 77 and a backstopping chuck 179, the continuously moving main conveyor 32 moves the bottles forwardly toward the first stenciling station 12. Just prior to arrival of the bottles at the first station 12, the indexing control roller 198 of the supporting backstopping chuck assembly is passed through an indexing control throat defining element or cam 205 (hereinafter referred to as a throat or cam 205). As may be seen most clearly in FIGS. 8, 10 and 11, each of the throats 205 comprises a tapered or narrowing entrance way 208 operable to catch or entrap the rollers 198 of the main bottle conveyor 32 as it transports the bottles forwardly on the machine. Once entrapped by the open mouth 208 of the indexing control cam 205, the roller is forced in the narrow throat shaped slot 209 of the cam 205 by converging tapered surfaces 210. The narrow throat shaped slot 209 positively and accurately fixes the index position of the roller 198 and thus of a bottle supported by a backstopping chuck 179 to which the roller 198 is attached. Immediately upon exiting from the narrow throat shaped slot 209 of the cam 205, the chucks 77, 179 are lowered by movement of the control followers 140, 140b off of the control cam surface 146, 146b. The bottle which is supported between the lowered chucks is thus placed against the top surface of the first screen or membrane 13. Frictional contact between the bottle and the membrane then causes the bottle to roll over the membrane as paint or decorative medium is forced upwardly through the stenciling screen. After having rolled less (or more if desired) than 360° over the screen, the chucks are lifted by reengagement of the followers 140, 140b with the cam surfaces 146, 146b.

When the bottle arrives at the second stenciling station 16, the indexing control roller 198 again enters and passes through a second indexing control throat 205 immediately prior to engagement of the bottle with the screen 15 of the second station 16. This same process is repeated at the third stenciling station 19.

Figure 11:
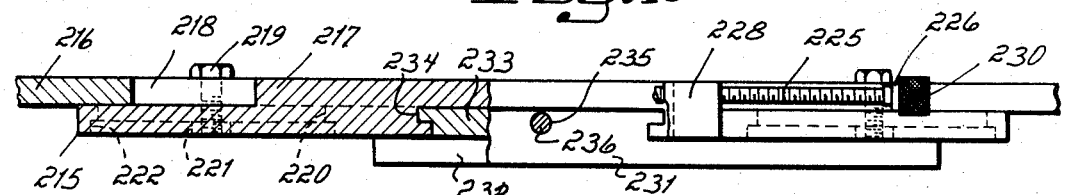
FIG. 11 is a cross-sectional view of the bottle indexing mechanism taken on line 11—11 of FIG. 10.
Figure 12:
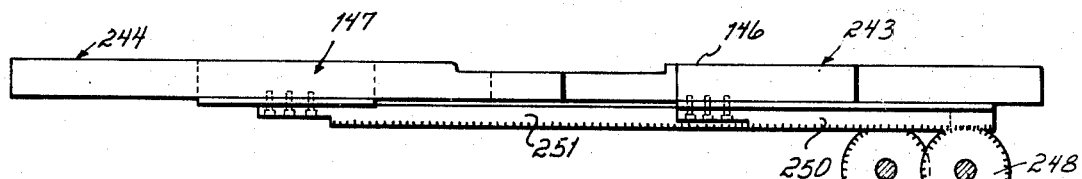
FIG. 12 is a cross-sectional view of the bottle let down cam adjusting mechanism taken on line 12—12 of FIG. 6.
Figure 13:
FIG. 13 is a cross-sectional view of a portion of the cam adjusting mechanism of FIG. 12 taken on line 13—13 of FIG. 6.

Referring now to FIGS. 10 and 11, there is illustrated in detail an indexing control cam 205. Since the three control cams 205 are all identical, only one has been illustrated in detail. Each of the control cams or cam assemblies 205 comprises a backing plate 215 adjustably mounted upon and supported from a stationary plate 216 attached to the rear frame plate 36 of the machine. A rearwardly extending protrusion 217 of the backing plate 215 is longitudinally slideable within a recess 218 of the frame plate 216. Four bolts 219 secure the backing plate 215 to the frame plate 216. These bolts 219 extend through apertures in the frame plate 216 and through longitudinal slots 220 in the frame plate and are threaded into nuts 221 on the front side of the backing plate 215. The nuts 221 reside within undercut recesses 222 of the longitudinal slots 220 in the backing plate 215.

Longitudinal adjustment of the backing plate 215 relative to the frame plate 216 is controlled by an adjustment screw 225. This screw extends through an L-shaped bracket 226 secured to the frame plate 216 and is fixed against longitudinal movement relative to the bracket. A generally U-shaped fixture 228 is secured to the top of the backing plate 215 and has a longitudinally threaded aperture 229 through which the adjustment screw 225 is threaded. Upon rotation of a knurled knob 230 on the end of the screw 225, the fixture 228, and thus the attached backing plate 215, are caused to move longitudinally relative to the stationary frame plate 216.

The indexing roller control plates or camming plates 231, 232 of the control cam 205 are mounted on the backing plate 215 in such a manner as to permit simultaneous vertical adjustment of the plates relative to the backing plate 215. To this end the two plates 231, 232 are fixedly secured to a slide plate 233. This slide plate is generally T-shaped in cross section (FIG. 11) and is slideable within a T-shaped slot 234 which extends vertically through the backing plate 215. Vertical adjustment of the slide plate 233 relative to the backing plate 215 is controlled by an adjustment screw 236 which extends vertically through the fixture 228 on the top of the backing plate 215 and is secured against vertical movement relative to the fixture. Its lower end is threaded into a vertical aperture 235 in the slide plate 233 so that rotation of a knurled knob 237 on the top of the screw effects vertical movement of the slide plate 233 and thus of the attached control plates 231, 232.

To secure the knurled knob 237 against inadvertant movement once the machine is properly set up, a locking set screw 238 is engageable with the knob 236. This set screw 238 extends vertically through a mounting bracket 239 attached by a screw 240 to the top of the fixture 228.

As was explained hereinabove, vertical movement of the chucks 77, 179 and thus of the bottles supported between the chucks, is controlled by movement of the follower rollers 144, 114b over the cam surfaces 146, 146b. Since accurate raising and lowering of the bottles is critical to accurate location of decorative patterns upon the bottles, the cam surfaces 146, 146b are located on the top of horizontally adjustable cam bar assemblies 147, 147b.

Referring now to FIGS. 6, 8, 12 and 13, it will be seen that the cam bar assemblies 147, 147b are identical in all respects and are adjusted by adjustment control shafts 241, 242. Therefore, only a single assembly of cam bars 147 has been illustrated and described in detail. It should be appreciated, however, that an identical assembly 147b is located on the rear of the machine immediately behind each of the three assemblies 147 on the front of the machine.

Each of the cam bar assemblies 147 comprises a pair of juxtapositioned cam bars 243, 244. These bars are slideable within slideways or grooves 245 of the supporting bracket 94 which is in turn attached to and supported from the front frame plate 37. (The frame plate 94b which supports the rear cam bar assemblies 240b is fixedly attached to the stationary frame plate 36.)

Adjustment of each of the two cam bars 243, 244 in the slot 245 is controlled independently by one of the pair of control shafts 241, 242. These shafts 241, 242 extend between and are rotatably supported by the frame plates 36, 37 of the machine. On the front end, a knurled knob on each shaft facilitates angular adjustment of the shaft. Medially of the ends of the shaft, a pair of spur gears 248, 248b, 249, 249b are drivingly keyed to the shaft. Each of these gears 248, 248b extends upwardly through a hole in the supporting plates 94, 94b and mates with a rack 250, 251 (250b, 251b) attached to one of the cam bars 243 or 244 (243b, 244b). Thus rotation of one of the shafts 241 effects longitudinal adjustment of one set of let-down cams 243, 243b of the main conveyor and adjustment of the other shaft 242 effects adjustment of the pick-up cams 244, 244b.

Paint box

At each of the three stenciling stations 12, 16 and 19 there is a paint box 22 adjustably supported upon the frame for both vertical and transverse movement. Referring to FIGS. 6, 8, 9, 17, 18 and 19, it will be seen that each paint box 22 comprises four side walls 271 interconected by a bottom wall 272. The top of each box 22 is open and is adapted to receive a rectangular stenciling frame 273 having a stencil secured over its top surface. Each stencil has one portion which is pervious to paint or coloring material contained within the box 22 and another portion which is impervious to the same decorative medium.

To secure the rectangular stenciling frame 273 to the top of the side walls 271 of the box 207, an L-shaped bracket 275 is secured to the top of each of the transverse side walls 271 of the box. Similar L-shaped brackets 276 are secured to the bottoms of the transverse side walls of the rectangular stencil frame 273. When the L-shaped brackets 276 of the stenciling frame are placed over the brackets 275 of the paint box, the brackets may be clamped together by conventional C clamps 278 to lock the stenciling frame 273 on the top of the box 22.

To facilitate transverse as well as vertical adjustment of each of the paint boxes 22, each box is supported from the rear stationary frame plate 36 of the machine. This support comprises a frame support block 280 secured to the frame plate 36. A dove-tailed vertical slideway 281 is machined in the front face of the support and is adapted to receive a vertical slide 282 which is movable within the slideway 281 under the control of a cone shaped cam 284 attached to an adjustable screw 285. The rear end of the screw is threaded into a threaded aperture 286 (FIG. 9) of the support block 280 such that rotation of a knurled knob 287 on the front end of the shaft 285 effects both axial and rotational movement of the shaft and of the attached conical cam 284. The cam 284 is engageable with a roller 288 rotatably secured to the bottom of the slide 282 so that axial movement of the cam 284 results in vertical displacement of the slide 282 in the slideway 281.

The paint box 22 is supported upon a platform 290 which extends forwardly from the slide 282. This platform 290 supports a transversely movable paint box carriage 291 which comprises a flat metal plate having a depending rectangular slide 294 movable within a transverse groove 295 in the top of the platform 290. Transverse movement of the carriage 291 is controlled by a screw 196 threaded into a threaded aperture in the carriage 291. The screw 296 extends forwardly from the carriage through a journal block 297 in the frame plate 37 and terminates at its forward end in a knurled knob 298. A pair of universal joints 299 in the screw shaft 296 accommodates vertical displacement of the supporting platform 290 and consequently of the carriage 291. The paint box 22 rests within a rectangular recess 300 in the top surface of the carriage 291.

As shown in FIGS. 18 and 19, a squeegee conveyor 310 is mounted interiorly of each of the paint boxes 22. Each conveyor comprises eight squeegee assemblies 311 mounted upon and driven from a pair of parallel chain conveyors 312, 313. The chain conveyors 312, 313 comprise endless chains of links 314 interconnected by connecting pins 315. In place of eight of the connecting pins 315 of each of the chains, squeegee supporting shafts 316 extend between the two chain conveyors 312, 313 and form the connecting pins of both chains. Between its ends 317, 318, each shaft 316 supports one of the eight squeegee assemblies.

Each squeegee assembly 311 comprises a supporting block 320 having a transverse aperture 321 through which one of the supporting shafts 316 extends. A transverse recess 322 in the outer edge of each of the blocks 320 accommodates a squeegee retainer 323 having a squeegee 324 fixedly mounted therein. Each block 320 has a forwardly extending platform 325 on its leading side and a similar platform 326 on its trailing side. A vertically movable paint elevator 328 is supported from the front platform 325 by a screw 329. Each screw is slideable within an aperture 330 of the platform 325 and is threaded into a threaded aperture of the platform. A compression spring 331 captured between the inside edge of the platform 325 and the head 332 on the inner end of the screw biases the screw and the attached elevator platform 328 inwardly.

To preclude sagging of the upper run of each of the chains 312, 313 and to maintain the upper edge 327 of each squeegee in engagement with the bottom of the stencil during passage of the squeegee beneath the stencil, the squeegee assemblies 311 on the upper run of the conveyors are supported by guide rail assemblies 335, 336 attached to the front and rear walls 271 of the paint box. Each guide rail assembly comprises a lower guide rail 338 having a forwardly extending flange 339 located beneath the end sections 317, 318 of the shafts 316. Additionally, each assembly also includes an upper rail 340 having a depending flange 341 engageable with the tops of the end sections 317, 318 of the shaft 316. These guide rails thus support and limit vertical displacement of the squeegees on the upper run of the conveyor.

Vertical displacement of the paint elevators 328 is controlled by a pair of tapered cams 342, 343 fixedly secured to the tops of the rails 340. These cams 342, 343 taper upwardly from the trailing or downstream side of the paint box to the leading side or as viewed in FIG. 18, taper upwardly from the right side to the left side in the direction of movement of the squeegees on the upper run of the conveyor. Consequently, the paint elevators move upwardly as the squeegee assemblies on the upper run of the conveyor move forwardly beneath the bottles.

Each chain 312, 313 of the squeegee conveyor is supported at its forward end by a drive sprocket 360 and at its rearward end by an idler sprocket 361. The two drive sprockets 360 are both drivingly keyed to a drive shaft 362 (FIGS. 6, 17 and 18) which extends between and is supported from the front and rear walls 271 of the paint boxes. A spur gear 363 on the rear end of the drive shaft 362 drives the squeegee conveyor. As may be seen most clearly in FIG. 17, this gear 363 is driven by a gear 365 through an idler gear 364. The idler gear is required to facilitate vertical adjustment of the paint box and the enclosed squeegee conveyor, as is explained more fully hereinafter. An output shaft 366 of an adjustable control unit 367 (FIG. 22) drives the gear 365. The adjustable unit 367 is driven by a shaft 368 from a conventional gear reduction unit which is in turn driven by chain and sprocket drive 370 from the main drive shaft 160 of the machine.

For purposes of accommodating vertical displacement of the paint box, the intermedaite or idler gear 364 is rotatably mounted upon a stub shaft 371. This shaft 371 is supported by a pair of links 372, 373, one 372 of which is attached at one end to the shaft 371 and at the opposite end to a stub shaft 369 journalled in a bracket of slide blocks 282. The shaft 362 rotatably supports the gear 363. The other link 373 is rotatably mounted at one end to the shaft 371 and is rotatably connected at its opposite end to the drive shaft 366. Thus, the gear 364 always remains a fixed distance from the axes of the two shafts 362, 366, irrespective of vertical adjustment of the paint box and adjustment of the vertical distance between the axes of the gears 363, 365.

The two idler sprockets 361 which support the rear ends of the chain conveyors 312, 313 are rotatably supported upon an idler shaft 374 which is, in turn, rotatably supported by the front and rear walls of the paint box.

Figure 22:
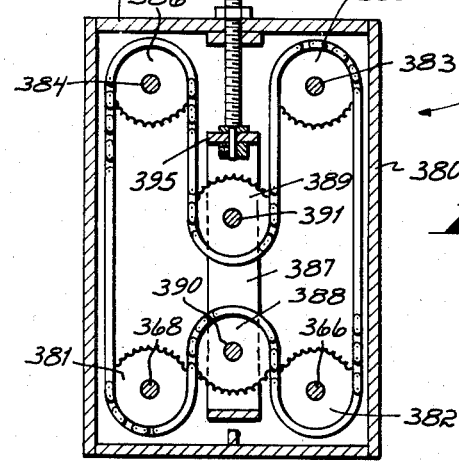
FIG. 22 is a cross-sectional view through a shaft adjustment mechanism taken on line 22—22 of FIG. 20.

Referring now to FIGS. 20 and 22, there is illustrated an adjustment device for rotating hte drive shaft 362 of each of the squeegee conveyors without affecting the adjustment of any of the other movable conveyor systems of the machine. This adjustment enables the squeegees 324 to be adjusted and located immediately beneath the lines of contact of bottles with the stencils.

Each of the adjustment devices 367 comprises an enclosure or housing 380 which supports the input shaft 368 and the output shaft 366. A sprocket 381, 382 is drivingly connected to each of these shafts. Immediately above the two shafts 366, 368 a pair of idler shafts 383, 384 extends between and is rotatably supported by the front and rear walls of the enclosure 380. Each of these idler shafts 383, 384 supports an idler sprocket 385, 386.

Adjustment of the relative angular relationships between the driving shaft and the driven shaft 366 is effected by vertical movement of a control bar 387. This bar rotatably supports a pair of vertically spaced idler sprockets 388, 389 upon a pair of rotatable stub shafts 380, 391. The control bar 387 is mounted for vertical movement under the control of a vertical screw 393 which is threaded through the top wall 394 of the housing 380 and is rotatably secured to a lateral flange 395 of the control bar 387 such that the screw is free to rotate relative to the bar 387 but is secured against axial movement relative to the bar. Thus, rotation of a handle 396 attached to the top of the screw 393 effects vertical displacement of the bar 387.

An endless chain extends beneath the driven sprocket 381, over the idler sprocket 386, beneath the idler sprocket 389, over the sprocket 385, beneath the driven sprocket 382 and over the idler sprocket 388. Since the driving shaft 368 is operatively geared to the main shaft 160 of the machine and is thus effectively secured against rotation during adjustment of the control device 367, upward vertical movement of the control bar 387 results in the stretch of chain which passes over the idler sprocket 388 being raised so as to cause clockwise rotation of the sprocket 382 as viewed in FIG. 22. During this clockwise rotation of the sprocket 382 and thus of the output shaft 366, the input shaft 368 does not rotate so that relative angular displacement occurs between these two shafts. Since the output shaft 366 is directly connected to the drive shaft 362 of the squeegee conveyer, and the driven shaft 368 is operatively connected to the main bottle conveyor through the main drive shaft 180, vertical adjustment of the handle 396 results in relative adjustment between bottles on the conveyor and the squeegees located beneath the bottles.

OUTPUT CONVEYOR

At the output end of the machine, bottles are transferred from the chucks of the main bottle conveyor 32 to pockets of the output conveyor 33. To effect this transfer, the chucks 77, 179 of the main conveyor must first be opened, or otherwise expressed, the mouthpiece chucks must be moved forwardly away from the backstopping chucks so as to release a bottle from between the two. This opening is effected by engagement of the rollers 116 of the mouthpiece chuck assemblies with an arcuate cam 410 at the forward end of the main conveyor 75.

As may be seen most clearly in FIG. 4, the arcuate cam 410 has a rise 411 at its upper end located in the path of movement and engagement by the rollers 116 of the mouthpiece chuck assemblies. This cam is operable to move the roller and the attached chuck 77 forwardly against the bias of the spring 127 so as to release the bottles from between the chucks 77, 179. When the chucks are opened, the bottles are deposited between the two sets of bumpers 412 on the output conveyor 33. The cam 410 then continues to hold the mouthpiece chuck in a withdrawn or forward position as the rollers 116 move over the cam through an arc of approximately 90°. Near the lower end 413 of the cam 410, the cam slopes rearwardly so as to permit the mouthpiece chucks to move rearwardly prior to the rollers moving off of the end 413 of the cam.

The output conveyor 33 is generally identical to the input conveyor 31 and runs parallel to the longitudinal path of travel of the input conveyor 31 and the main conveyor 32. Specifically, the output conveyor comprises a pair of endless chains 415, 416 supported at their forward end by driving sprockets 417, 418 (FIG. 20) respectively. The driving sprockets 417, 418 are supported from and nonrotatably keyed to a drive shaft 419 which extends between and is rotatable within the machine frame plates 36, 37. A chain and sprocket 420 is operable to drive the shaft 419 from the main drive shaft 160 through a gear box 421. At the rear end, the chains 415, 416 are supported upon idler sprockets 423, 424 which are keyed to a support shaft 425. This shaft 425 is rotatably journalled in stationary frame plates 426, 427 of the machine frame.

The two chains 415, 416 are interconnected by bumper support plates 430 which extend between and are connected to links of both of the chains. A pair of vertically upstanding bumpers 412 are mounted upon each of the support plates 430. Sequential pairs of bumpers define the pockets within which bottles are deposited upon opening of the chucks of the main conveyor 32 of the machine. The drive to the output conveyor 33 is synchronized with the drive to the main conveyor 32 so that the bottles are located over the pockets of the output conveyor when they arrive at the end of the main conveyor.

From the output conveyor 33, bottles are transported out of the machine by the vacuum pick up wheel 34. This wheel is identical to the letdown wheel 28 at the input end of the machine and forms no part of the invention of this application. It has, therefore, not been described in detail herein but is the subject matter of a separate patent application assigned to the assignee of this application.

To remove the bottles from the output conveyor 33, the bottle must be moved rearwardly or toward the vacuum wheel 34 while located on the output conveyor 33 so as to place the bottles in engagement with one of the suction cups 435 on the periphery 434 of the vacuum take off wheel 34. Upon engagement with a vacuum cup 435, the bottle is securely locked to the cup by the vacuum and remains in contact with the wheel 34 through 90° of rotation of the wheel after which the bottle is removed from the wheel and fed out of the machine on another conveyor.

Movement of the bottles rearwardly into engagement with a vacuum cup 435 while the bottles are located on the output conveyor 33 is effected by a reciprocating disc 436 which taps the mouthpieces of the bottles as the bottles pass the disc, thus pushing the bottles rearwardly into engagement with a suction cup 435.

Reciprocation of the disc 436 is controlled by a rotatable wheel 437. This wheel has three rollers 438 equidistantly spaced about its periphery and engageable with a ramp 439 of a cam block 440. The block 440 is rigidly secured to a vertical support bar intermediate the ends of the bar 441. At its lower end, the bar is pivotally mounted upon the frame and at its upper end the bar supports a threaded shaft 442. The disc 436 is rotatably mounted upon the rear end of the shaft 442. To facilitate adjustment of the shaft relative to the bar, the shaft 442 is threaded through the bar 441 and is secured in an adjusted position by a lock nut 443. A tension spring 445 is connected at one end to the movable bar 441 and at the other end to a vertically extending stationary frame bar 446 so as to bias the movable bar forwardly toward the stationary frame bar 446. Movement of the bar 441 toward the stationary bar 446 is limited by an adjustable screw 447 which is threaded through the bar 446 and is engageable at its rear end with a rubber or resilient pad 448 secured to the movable bar 441.

The wheel 437 which controls reciprocation of the movable bar 441 is rotatably mounted upon a support shaft 450 which is in turn rotatably supported by a journal block 451 attached to the front frame plate 37 of the machine. A chain and sprocket drive 452 interconnects the shaft 450 to the drive shaft 419 of the output conveyor such that the disc 437 is driven from and in synchronization with the drive shaft 419.

In operation, the rollers 438 of the disc 437 sequentially engage the cam surface 439 attached to the movable bar 441 and ride upwardly over the cam surface so as to force the movable bar 441 rearwardly against the bias of the tensioning spring 445. As the roller moves off of the cam surface, the tensioning spring 445 pulls the movable bar forwardly until it engages the abutment stop 447. Reciprocating movement of the bar is synchronized with movement of the bottles on the output conveyor 33 such that the disc 436 engages and taps the mouthpiece of a bottle as it passes the disc so as to push the bottle into engagement with one of the suction cups 435 of the pick up wheel 34. The vacuum applied to the cup 435 then securely holds the bottle on the wheel as it is moved upwardly out of the machine.

Machine operation

Bottles are fed into the decorating machine of this application in single file and spaced apart a predetermined distance. A star wheel or other segregating mechanism effects this single file spaced feeding of bottles into the infeed conveyor 25. Belts 26, 27 of the infeed conveyor 25 then transport the bottles to a continuously rotating letdown wheel 28. Upon arrival of each bottle at the wheel 28, a vacuum is applied to the vacuum cup 29 of the wheel which is at the 12 o'clock position so that the cup may engage and securely hold the bottle. This vacuum is maintained through approximately 90° of rotation of the wheel so that bottles supported by the vacuum wheel are lowered onto the input conveyor 31. Just prior to arrival of a bottle on the input conveyor 31 of the machine, the vacuum is released to the suction cup so that the bottle is deposited in a pocket of the input conveyor.

The speed of the bottles while supported by the letdown wheel 28 is greater than the speed the bottles would move if simply allowed to fall off of the infeed conveyor. Consequently, the speed of the machine is not limited by gravitational acceleration rate of a bottle falling off the infeed conveyor onto the input conveyor 31.

The continuously moving input conveyor 31 then feeds the bottles linearly into the main chucking conveyor 32 of the machine.

The main chucking conveyor 32 of the machine comprises two conveyors; a mouthpiece chuck conveyor 76, and a backstopping chuck conveyor 175. Each chuck 77 of the mouthpiece chuck conveyor 76 is mounted directly in front of a chuck 179 of the backstopping chuck conveyor 175 such that each backstopping chuck 179 is cooperable with a mouthpiece chuck 77 to rotatably support a bottle during movement on the continuously moving main conveyor 32. The backstopping chucks of the main conveyor are supported for rotation in supporting brackets of the conveyor 175 but are secured against axial movement while the mouthpiece chucks of the mouthpiece chucking conveyor 76 are all rotatable as well as axially movable. Axial movement of the mouthpiece chucks 77 is controlled by rollers 116 operatively associated with each of the mouthpiece chucks 77 and cooperable with arcuate cams 400, 410 at opposite ends of the main conveyor to open the pairs of chucks 77, 179. Closing of the bottle chucks is effected by a spring 127 of each mouthpiece chuck assembly. This spring causes rearward closing movement of each of the mouthpiece chucks whenever the follower rollers 116 ride off of the cams 400, 410.

Just prior to arrival of a bottle at the forward end of the input conveyor 31, a previously opened pair of chucks are moved into axial alignment with the bottle. Upon becoming aligned with a bottle, the follower roller 116 of the mouthpiece chuck rides off of the arcuate cam 400 to effect relative closing of the two chucks so that the bottle is then supported by and between the chucks.

Simultaneously with the closing of the chucks 77, 179 upon a bottle, an indexing control roller 198 of the backstopping chuck assembly engages and moves over a generally arcuate cam 200 at the trailing end of the main conveyor. This cam forces the indexing control rollers upwardly and then to the rear or trailing side of the backstopping chuck assembly so that the rollers may then enter a throat of an indexing control cam 205 while located on the trailing side of the assembly.

In moving along the main conveyor, the mouthpiece chuck supporting brackets 106 and the backstopping chuck support brackets 106b are held in a raised or elevated position by the followers 140, 140b respectively. These followers ride over a cam surface 146 of cams 147 until a bottle supported between the chucks arives at the first stenciling station. Just prior to arrival at the first senciling station, the indexing control roller 198 of the backstopping chuck is passed through an indexing control cam assembly 205. In passing through the throat 209 of this assembly, a bottle supported between the chucks is positively angularly located so that thereafter, subsequent indexing control cam assemblies 205 may positively fix the particular angular position of the same bottle relative to subsequent indexing stations.

Immediately upon passage of the indexing control follower 198 through or out of the throat 209 of the first cam assembly, the followers 140, 140b of the supporting chucks pass off of the cam surface 146 so that the bottle supported therebetween is lowered onto the stencil of the first stenciling station 12. The downward force applied by the bottle to the stencil is controlled by the compression of springs 153, 154, 153b, 154b of the chuck assemblies. Upon engagement of a bottle with the stencil 13, the bottle is free to rotate during continued linear movement of the bottles over the stencil as a consequence of frictional contact of the bottle with the stencil. While the bottle rolls over the stencil, squeegee 324 is positioned immediately beneath the bottle and moves in synchronization with the bottle over the stenciling screen. While the squeegee moves with the bottle, a paint platform or elevator 328 in front of the squeegee is raised toward the stenciling screen. In passing around the trailing end of the squeegee conveyor, the paint elevators pick up a deposit of paint so that when subsequently moved along in front of a squeegee on the upper run of the conveyor, the raising of the elevator maintains the decreasing paint deposit on the elevator in contact with the lower side of the stencil. In passing around the trailing end of the squeegee conveyor, each squeegee blade picks up a deposit of paint from the paint box reservoir and carries it upwardly on the platform 328 in front of the blade. When the paint box is initially filled with paint or decorative medium, the level of the paint is generally below the upper run of the chain 313 or, otherwise expressed the box is filled to a level at which it is approximately three-quarters full. The machine will continue to operate and decorative material will continue to be picked up by the squeegee blades onto the platforms 328 as the squeegees pass around the trailing end of the conveyor so long as the level of paint is above the bottoms of the squeegees located on the bottom run of the conveyor. In actual practice, this level may be one quarter inch from the bottom 272 of the paint box. The continuously running squeegees tend to push the paint toward the trailing end of the box so that even a bare minimum of paint in the box just above the bottoms of the squeegees on the lower run of the conveyor is sufficient to force a puddle or reservoir of paint toward the trailing end of the paint box where the squeegees can then pick it up and carry it upwardly on the platform in front of the squeegees. To compensate for that paint which is used up in decorating the bottles and that which runs off of the platform 328 as the platform moves along the upper run of the conveyor beneath the stencils 13, 15, or 18, the platform gradually moves upwardly as it passes beneath the stencil (see FIG. 18). Thus there is always a puddle of paint located immediately in front of the squeegees 324 so long as they are in contact with the pervious portion of a stencil.

After the bottle has rotated through almost 360° on the first stencil, the rollers 144, 144b associated with the followers 140, 140b again contact the raised portion of the cam surface 146, 146b, thereby raising the supporting brackets 106, 106b and the chucks supported by the brackets. Thus, the bottle is raised off of the stencil.

Upon arrival of the bottles at the second stenciling station, this same procedure is followed; the bottle is indexed to a predetermined angular position by passage of the indexing control roller 198 through the throat of an indexing control assembly 205, the bottle is lowered onto the surface of the stencil upon passage of the follower rollers 144, 144b off of the surface 246 of the cam 147, a second or foreground coloring pattern is applied to the bottle as it frictionally rolls across the surface of the second stenciling station, and the bottle is lifted off of the stencil by the cams 140, 140b after the second pattern is applied to the bottle.

If a third pattern is to be applied, this same procedure is repeated in the third stenciling station and at any subsequent stations if more than three colors are to be applied to the bottles.

After being lifted off of the stencil of the third stenciling station, the bottles are transported forwardly to the output conveyor 33. When the bottles are located between supporting lugs 412 of the output conveyor 33, the chucks of the chucking conveyor 76, 175 pass around the drive wheels 88, 89, 88b, 89b of the conveyors and the rollers 116 of the mouthpiece chucking assemblies engage the cam 410 and are moved forwardly by the cam to open the chucks. This results in the chuck supported bottle being deposited upon the top tapered surface of the lugs on the output conveyor 33. The bottles are then conveyed forwardly on the output conveyor 33 until they are axially aligned with a suction cup 435 of a vacuum pick-up wheel 34. As the bottles move into axial alignment with a suction cup, the reciprocating disc 436 engages and pushes the bottle rearwardly into engagement with the suction cup. Since the vacum is then applied to the cup, the bottle is securely gripped by the cup and conveyed to a vertical position at which the bottle is released by the vacuum wheel and simultaneously engaged by take out belts of the outfeed conveyor.

While only one preferred embodiment of the invention of this application has been illustrated and desescribed in detail herein, those persons skilled in the arts to which this invention pertains will readily appreciate numerous changes and modifications which may be made without departing from the spirit of our invention. Specifically, while the bottles have been described as being frictionally driven in rotation over the stencils or membranes, the chucks could as well be positively driven through an appropriate drive system. Therefore, we do not intend to be limited except by the scope of the appended claims.

Having described our invention, we claim:

1. Apparatus for decorating generally cylindrical ware which comprises:

a stationary screen membrane which has a portion pervious to a decorative medium and another portion impervious to the same decorative medium, a transport conveyor for transporting said ware over said screen membrane, means mounting said ware on said conveyor for rotation relative to said membrane as said ware is moved over said membrane by said conveyor, a reservoir of decorative medium, means for supplying said decorative medium from said reservoir to the underside of said membrane, and continuously moving means movable in an endless path for forcing said decorative medium upwardly through the screen membrane from beneath the membrane as the ware rotates in contact with the top of the membrane so that a pattern of said decorative medium is transferred to said ware.

2. The apparatus of claim 1 wherein rotation of said ware relative to said memebrane is effected as a consequence of frictional contact of said ware with said membrane.

3. The apparatus of claim 1 wherein said means for forcing said decorative medium upwardly through the screen membrane comprises a sequeegee and a vertically movable platform mounted in front of said squeegee, said platform being movable upwardly as the medium on said platform is reduced during movement beneath said membrane.

4. The apparatus of claim 1 in which said conveyor is an endless, continuously moving conveyor.

5. The apparatus of claim 1 in which said conveyor comprises a plurality of ware chucks, each of said chucks being operative to support a single item of ware as it is transported over said screen.

6. The apparatus of claim 1 in which said reservoir includes a container of decorative medium located beneath said membrane, said means for forcing decorative medium thorugh the screen membrane being movable through said medium in said container after passing from beneath one item of ware and before being located beneath the next item of ware.

7. The apparatus of claim 6 wherein said container is adjustable vertically and transversely relative to the path of travel of said conveyor so as to accommodate varying size ware.

8. The apparatus of claim 5 which further includes means for simultaneously adjusting all of said chucks on said conveyor to accommodate ware of differing axial lengths.

9. The apparatus of claim 6 which further includes means for adjusting the speed of said conveyor.

10. Apparatus for decorating generally cylindrical ware which comprises:

a stationary screen membrane which has a portion pervious to a decorative medium and another portion impervious to the same decorative medium, a transport conveyor for transporting ware over said screen membrane, said ware being rotatable relative to said membrane when in contact with said membrane, means for moving at least one squeegee beneath said screen membrane in synchronization with movement of ware over the top of the screen, a container of decorative medium located beneath said membrane, said squeegee being movable through said medium in said container after passing from beneath one item of ware and before being located beneath the next time of ware.

11. The apparatus of claim 10 in which said transport conveyor is a continuously moving, endless conveyor and in which said means for moving said squeegee is a continuously moving, endless conveyor.

12. Apparatus for decorating generally cylindrical ware which comprises:

a plurality of stationary screen membranes, each of said membranes having one portion pervious to a decorative medium and another portion impervious to the same decorative medium.

a continuously moving conveyor for transporting ware over each of said screen membranes, means mounting said ware on said conveyor for rotation relative to each of said membranes when in contact with said membranes, a reservoir of decorative medium, means for supplying decorative medium from said reservoir to the underside of said membrane, and means for continuously moving at least one squeegee having decorative medium thereon transported from said supply means to beneath each of said screen membranes in synchronization with movement of ware over the top of the membranes so that a pattern of said decorative medium is forced upwardly through said membranes to each of said items of ware as it rotates in contact with said membrane.

13. The apparatus of claim 12 wherein a plurality of items of ware on said conveyor are simultaneously engageable with each of said membranes, said apparatus further including a plurality of squeegees simultaneously engageable with each of said membranes, said squeegees being movable in synchronization with said items of ware over each of said membranes so that a squeegee is located beneath each of said items of ware as it moves over said membranes.

14. The apparatus of claim 12 in which said reservoir includes a container of decorative medium located beneath each of said membranes, said squeegees being movable through said medium in said container after passing from beneath one item of ware and before being located beneath the next item of ware.

15. The apparatus of claim 12 wherein rotation of said ware relative to said membranes is at least partially effected by frictional engagement of said ware with said membranes.

16. Apparatus for decorating generally cylindrical ware which comprises:

a stationary screen membrane which has a portion pervious to a decoative medium and another portion impervious to the same decorative medium, a transport conveyor for transporting said ware over said screen membrane, said conveyor comprising a plurality of pair of rotatable chucks operable to support ware on said conveyor for rotation relative to said membrane, a throat defining element located adjacent said screen, an eccentric pin on one of each of said pairs of rotatable chucks, said pin being engageable with and movable through a slot in said throat defining element located adjacent said screen membrane so as to orient said chuck and thus the bottle supported by the chuck relative to the membrane prior to engagement of the bottle with the membrane, and means for forcing decorative medium upwardly through the screen membrane from beneath the membrane as the ware rotates over the top of the membrane so that a pattern of said decorative medium is transferred to said ware.

17. The apparatus of claim 16 which further includes means to adjust said throat defining element vertically to vary the angular position of ware as it emerges from said throat.

18. The apparatus of claim 17 which further includes means to adjust said throat defining element longitudinally to vary the longitudinal position at which said ware emerges from said throat and engages said membrane.

19. Apparatus for decorating generally cylindrical ware which comprises:

a plurality of stationary screen membranes, each of said membranes having one portion pervious to a decorative medium and another portion impervious to the same decorative medium, a continuously moving conveyor for transporting ware over each of said screen membranes, said conveyor comprising a plurality of pairs of rotatable chucks operable to support ware on said conveyor for rotation relative to said membrane, an eccentric pin on one of each of said pair of rotatable chucks, said pins being engageable with and movable through a throat located adjacent each of said membranes so as to orient said chucks and thus the bottles supported by the chucks relative to the membranes prior to engagement of the bottles with the membranes, and means for continuously moving at least one squeegee having decorative medium thereon beneath each of said screen membranes in synchronization with movement of ware over the top of the membrane so that a pattern of said decorative medium is transferred to each of said items of ware as it rotates over said membrane.

20. The apparatus of claim 19 which further includes means to adjust said throats vertically to vary the angular position of ware as it emerges from said throats.

21. The apparatus of claim 20 which further includes means to adjust said throats longitudinally to vary the longitudinal position at which said ware emerges from said throats and engages said membranes.

22. Apparatus for decorating generally cylindrical ware which comprises:

a stationary screen membrane which has a portion pervious to a decorative medium and another portion impervious to the same decorative medium, a transport conveyor for transporting said ware over said screen membrane, said conveyor comprising a plurality of pairs of rotatable chucks, each pair of chucks being operable to rotatably support an item of ware as it is moved over said membrane, said pairs of chucks being spring biased downwardly so as to resiliently bias an item of ware into engagement with said membrane as said ware is moved over said membrane, said resilient bias of said chucks thereby enabling an out-of-round item of ware to be maintained in engagement with said membrane as it is rotated over said membrane, and means for forcing decorative medium upwardly through the screen membrane from beneath the membrane as the ware rotates over the top of the membrane so that a pattern of said decorative medium is transferred to said ware.

23. Apparatus for decorating generally cylindrical ware which comprises:

a plurality of stationary screen membranes, each of said membranes having one portion pervious to a decorative medium and another portion impervious to the same decorative medium, a continuously moving conveyor for transporting ware over each of said screen membranes while in contact with said membranes, said ware being rotatable relative to each of said membranes when in contact with said membranes, the spacing of ware on said conveyor being such that a plurality of items of ware are simultaneously engageable with each of said membranes, means for continuously moving a plurality of squeegees having decorative medium thereon over one side of each of said screen membranes in synchronization with movement of ware over the opposite sides of said membranes so that a pattern of said decorative medium is simultaneously forced upwardly through the membranes to a plurality of said items of ware as they are rotated relative to said membranes.

References Cited

UNITED STATES PATENTS

| 2,027,102 | 1/1936 | Hommel et al. | 101—123 |
| 2,121,491 | 6/1938 | Soubier | 101—123 |
| 2,369,073 | 2/1945 | Payne | 101—39 |
| 2,767,647 | 10/1956 | Hakogi | 101—126 |
| 2,881,699 | 4/1959 | Hakogi | 101—126 |
| 3,237,555 | 3/1966 | Jones et al. | 101—38 |
| 3,251,298 | 5/1966 | Rudolph et al. | 101—40 |
| 3,253,538 | 5/1966 | Rudolph et al. | 101—40 |
| 3,309,986 | 3/1967 | Worth | 101—39 |
| 3,311,051 | 3/1967 | Rudolph et al. | 101—40 |

WILLIAM B. PENN, Primary Examiner

U.S. Cl. X.R.

101—123, 126

UNITED STATES PATENT OFFICE
CERTIFICATE OF CORRECTION

Patent No. 3,518,938          Dated July 7, 1970

Inventor(s) Edmund B. Donner and Gerald E. Ellis

It is certified that error appears in the above-identified patent and that said Letters Patent are hereby corrected as shown below:

Column 1, line 29, change "effect" to --effort--.

Column 1, line 36, change "returntable" to --returnable--.

Column 1, line 46, change "bottle" to --bottles--.

Column 1, line 60, change "become" to --becomes--.

Column 2, line 28, change "article" to --articles--.

Column 2, line 32, change "the" to --and--.

Column 2, line 49, change "recprating" to --decorating--.

Column 3, line 31, change "useof" to --use of--.

Column 4, line 49, the last word is blurred and it should be --or--.

Column 6, line 53, change "driven" to --drive--.

Column 6, line 58, change "gide" to --guide--.

Column 7, line 21, change "termniates" to --terminates--.

Column 7, line 26, change "100" to -110--.

UNITED STATES PATENT OFFICE
CERTIFICATE OF CORRECTION

PAGE - 2

Patent No. 3,518,938          Dated July 7, 1970

Inventor(s) Edmund B. Donner and Gerald E. Ellis

It is certified that error appears in the above-identified patent and that said Letters Patent are hereby corrected as shown below:

Column 7, line 26, change "barcket" to --bracket--.

Column 7, line 33, change "tihs" to --this--.

Column 7, line 59, add "144" after the word roller.

Column 7, line 63, insert "of" after the word off.

Column 7, line 67, change "conrol" to --control--.

Column 8, line 2, change "70" to --79--.

Column 9, line 30, change "asesmbly" to --assembly--.

Column 9, line 57, change "is" to --of--.

Column 10, line 5, change "passes" to --pass--.

Column 11, line 45, change "114b" to --144b--.

Column 13, line 51, insert "drive" before the word gear.

Column 14, line 6, change "hte" to --the--.

Column 14, line 31, change "ot" to --to--.

Column 14, line 69, change "engagement" to --engageable--.

Column 17, line 25, change "arives" to --arrives--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents